(12) United States Patent
Rodgers et al.

(10) Patent No.: US 9,584,436 B1
(45) Date of Patent: Feb. 28, 2017

(54) METHOD AND SYSTEM FOR MANAGING CLASS OF SERVICE IN A NETWORK

(71) Applicant: Skyport Systems, Inc., Mountain View, CA (US)

(72) Inventors: Robert Stephen Rodgers, Mountain View, CA (US); William Norman Eatherton, San Jose, CA (US); Michael John Beesley, Atherton, CA (US); Stefan Alexander Dyckerhoff, Palo Alto, CA (US); Philippe Gilbert Lacroute, Sunnyvale, CA (US); Edward Ronald Swierk, Mountain View, CA (US); Neil Vincent Geraghty, San Francisco, CA (US); Keith Eric Holleman, Campbell, CA (US); Thomas John Giuli, Mountain View, CA (US); Srivatsan Rajagopal, Cupertino, CA (US); Paul Edward Fraley, Sunnyvale, CA (US); Vijay Krishnaji Tapaskar, Palo Alto, CA (US); Daniel Sergeevich Selifonov, Mountain View, CA (US); Keith Anthony Low, San Mateo, CA (US)

(73) Assignee: Skyport Systems, Inc., Mountain View, CA (US)

( * ) Notice: Subject to any disclaimer, the term of this patent is extended or adjusted under 35 U.S.C. 154(b) by 188 days.

(21) Appl. No.: 14/705,621

(22) Filed: May 6, 2015

Related U.S. Application Data

(60) Provisional application No. 61/989,957, filed on May 7, 2014.

(51) Int. Cl.
*H04L 12/911* (2013.01)
*H04L 29/08* (2006.01)
(Continued)

(52) U.S. Cl.
CPC .............. *H04L 47/70* (2013.01); *H04L 45/50* (2013.01); *H04L 61/1511* (2013.01);
(Continued)

(58) Field of Classification Search
None
See application file for complete search history.

(56) References Cited

U.S. PATENT DOCUMENTS

| 7,870,153 | B2 | 1/2011 | Croft et al. |
| 7,886,023 | B1 | 2/2011 | Johnson |

(Continued)

*Primary Examiner* — Greg C Bengzon
(74) *Attorney, Agent, or Firm* — Osha Liang LLP

(57) ABSTRACT

In general, embodiments of the invention relate to a method and system for managing network access for applications. More specifically, embodiments of the invention provide mock Internet Protocol (IP) addresses to the applications, where the applications may use the mock IP addresses to communicate with other systems (e.g., other computing devices, the management service, or any other system that is accessible via the network). Each mock IP address may be associated with one or more policies, where the policies dictate how packets that includes the mock IP address are processed. In one or more embodiments of the invention, the mock IP addresses may be used to maintain a class of service (CoS) between applications executing on the computing devices and an application service provider (ASP).

12 Claims, 20 Drawing Sheets

(51) Int. Cl.
*H04L 29/12* (2006.01)
*H04L 12/723* (2013.01)

(52) U.S. Cl.
CPC .......... *H04L 61/2007* (2013.01); *H04L 67/02* (2013.01); *H04L 67/16* (2013.01); *H04L 67/28* (2013.01)

(56) References Cited

U.S. PATENT DOCUMENTS

| | | | |
|---|---|---|---|
| 8,010,679 B2 | 8/2011 | Low et al. | |
| 8,051,180 B2 | 11/2011 | Mazzaferri et al. | |
| 8,423,631 B1* | 4/2013 | Mower | H04L 12/6418 709/223 |
| 8,438,654 B1 | 5/2013 | von Eicken et al. | |
| 8,572,400 B2 | 10/2013 | Lin et al. | |
| 8,607,054 B2 | 12/2013 | Ramarathinam et al. | |
| 8,621,556 B1* | 12/2013 | Bharali | H04L 61/1511 726/1 |
| 9,154,479 B1* | 10/2015 | Sethi | H04L 63/08 |
| 9,183,028 B1* | 11/2015 | Brandwine | H04L 67/2823 |
| 9,215,237 B2* | 12/2015 | Sonoda | H04L 63/105 |
| 9,294,437 B1* | 3/2016 | Ganguly | H04L 63/0272 |
| 9,350,706 B1* | 5/2016 | Smith | H04L 63/0245 |
| 9,363,282 B1* | 6/2016 | Yu | H04L 63/1425 |
| 2007/0214505 A1* | 9/2007 | Stavrou | G06F 21/55 726/24 |
| 2009/0241167 A1* | 9/2009 | Moore | H04L 29/12066 726/1 |
| 2009/0288084 A1* | 11/2009 | Astete | G06F 9/45533 718/1 |
| 2010/0054222 A1* | 3/2010 | Rune | H04L 29/12066 370/338 |
| 2010/0088405 A1 | 4/2010 | Huang et al. | |
| 2010/0251329 A1* | 9/2010 | Wei | H04L 63/1408 726/1 |
| 2011/0162042 A1 | 6/2011 | Xiao et al. | |
| 2011/0289134 A1* | 11/2011 | de los Reyes | H04L 63/20 709/203 |
| 2012/0151209 A1 | 6/2012 | Visnyak et al. | |
| 2012/0281706 A1* | 11/2012 | Agarwal | H04L 67/1002 370/395.53 |
| 2013/0067086 A1* | 3/2013 | Hershko | H04L 61/157 709/225 |
| 2013/0117847 A1* | 5/2013 | Friedman | H04L 63/1425 726/22 |
| 2013/0152187 A1* | 6/2013 | Strebe | H04L 63/101 726/11 |
| 2013/0185715 A1 | 7/2013 | Dunning et al. | |
| 2013/0205376 A1 | 8/2013 | Narasimha et al. | |
| 2014/0040503 A1* | 2/2014 | Mower | H04L 12/6418 709/238 |
| 2014/0052830 A1* | 2/2014 | Bigall | H04L 41/0803 709/220 |
| 2014/0052877 A1* | 2/2014 | Mao | H04L 61/103 709/245 |
| 2014/0108649 A1* | 4/2014 | Barton | G06F 9/45533 709/224 |
| 2014/0115715 A1* | 4/2014 | Pasdar | G06F 21/6245 726/26 |
| 2014/0181966 A1* | 6/2014 | Carney | H04L 63/1458 726/22 |
| 2014/0237585 A1* | 8/2014 | Khan | H04L 63/16 726/15 |
| 2014/0245421 A1* | 8/2014 | Lyon | H04L 63/1458 726/11 |
| 2014/0245423 A1* | 8/2014 | Lee | H04L 63/0218 726/12 |
| 2014/0280963 A1* | 9/2014 | Burbridge | H04L 61/1511 709/226 |
| 2014/0281500 A1 | 9/2014 | Ignatchenko | |
| 2014/0282543 A1* | 9/2014 | Ignatchenko | G06F 9/45558 718/1 |
| 2014/0283051 A1* | 9/2014 | Doron | H04L 63/1458 726/23 |
| 2014/0310389 A1* | 10/2014 | Lee | H04L 41/00 709/223 |
| 2014/0344475 A1 | 11/2014 | Chen et al. | |
| 2014/0344917 A1* | 11/2014 | Parla | H04L 63/0272 726/15 |
| 2015/0007250 A1 | 1/2015 | Dicato, Jr. et al. | |
| 2015/0074221 A1* | 3/2015 | Kuparinen | H04L 29/12066 709/214 |
| 2015/0215308 A1 | 7/2015 | Manolov et al. | |
| 2015/0237068 A1* | 8/2015 | Sandke | H04L 63/1466 726/23 |
| 2016/0021055 A1 | 1/2016 | Krzywonos et al. | |
| 2016/0050229 A1* | 2/2016 | Patel | H04L 63/1458 726/23 |
| 2016/0227265 A1* | 8/2016 | Harrison | H04L 67/16 |
| 2016/0248813 A1* | 8/2016 | Byrnes | H04L 63/20 |

* cited by examiner

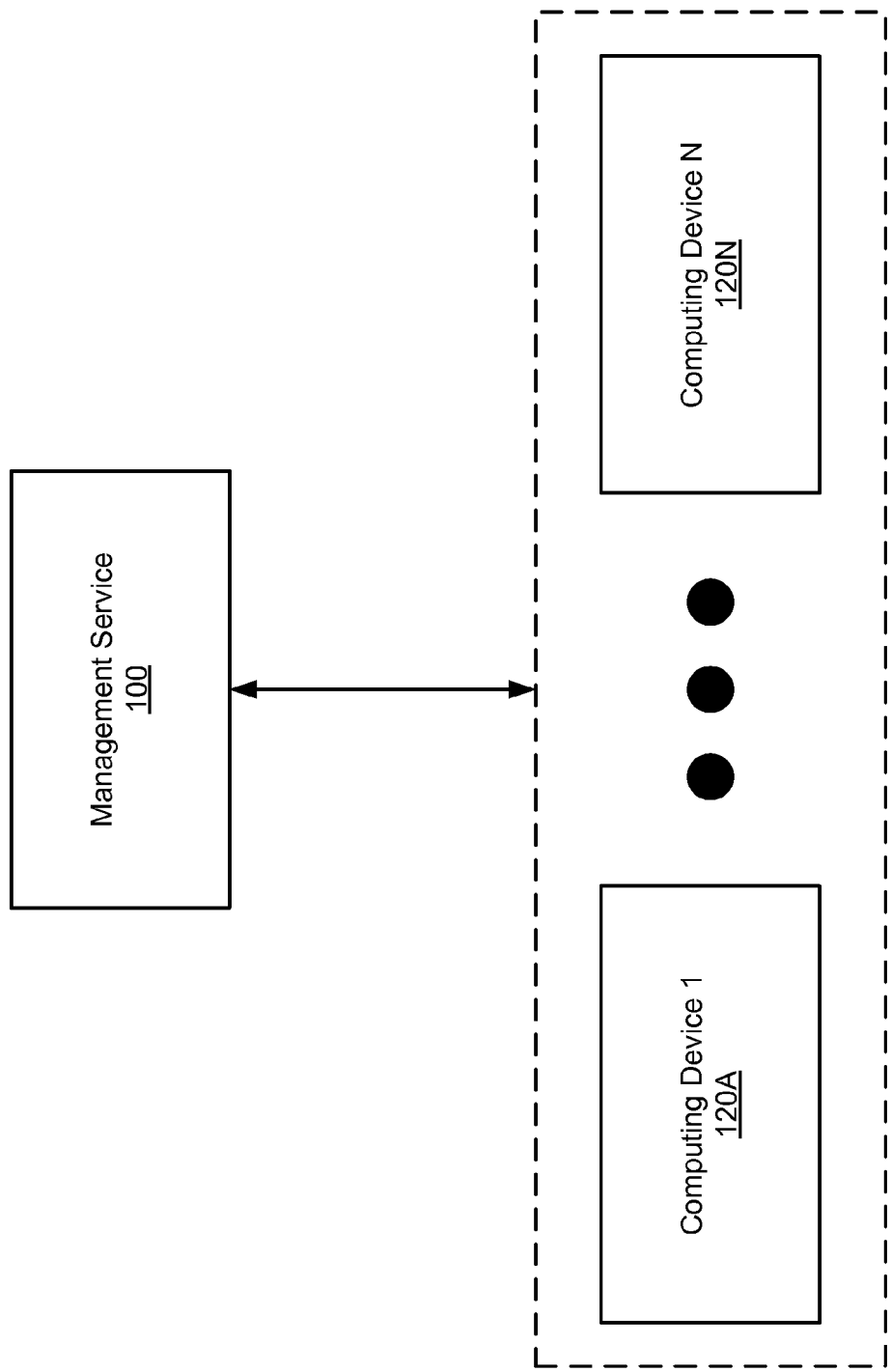

METHOD AND SYSTEM FOR MANAGING CLASS OF SERVICE IN A NETWORK

CROSS-REFERENCE TO RELATED APPLICATIONS

This application claims priority to U.S. Provisional Patent Application No. 61/989,957 filed May 7, 2014, the entire disclosure of which is hereby expressly incorporated by reference herein.

BACKGROUND

Applications may communicate with other systems via a network. Systems connected to a network are often vulnerable to various types of attacks. These attacks may impact the transfer of packets over the network, impact a source from sending packets on the network, and/or the connectivity between systems on the network.

SUMMARY

In general, in one aspect, the invention relates to a method for managing network access, comprising: issuing, by an application executing an application virtual machine (AVM), a request for a domain name service (DNS) resolver to resolve a mock fully qualified domain name (FQDN), wherein the mock FQDN is associated with an application service provider (ASP), processing, by a DNS proxy executing in a service virtual machine (SVM), the request in order to obtain a mock Internet Protocol (IP) address, providing, by the DNS proxy, the mock IP address to the application, transmitting, by the application, a first packet comprising the mock IP address, receiving, by a network adaptor, the first packet, obtaining, by the network adaptor, a first policy associated with the mock IP address, and replacing, by the network adaptor, the mock IP address in the first packet with a first IP address to obtain a second packet, wherein the first IP address is associated with a remote server host and is specified in the first policy, transmitting the second packet towards the remote server host, wherein the remote server host is associated with the ASP, after transmitting the second packet: receiving, by the computing device, an updated policy from a management service, updating, based on the updated policy, a first policy to obtain a second policy, wherein the second policy comprises a second IP address and is associated with the mock IP address, transmitting, by the application, a third packet comprising the mock IP address, receiving, by the network adaptor, the third packet, obtaining, by the network adaptor, a second policy associated with the mock IP address, and replacing, by the network adaptor, the mock IP address in the third packet with the second IP address to obtain a fourth packet, wherein the second IP address is associated with the remote server host, transmitting the fourth packet towards the remote server host, wherein the AVM and the SVM execute on a computing device, wherein the computing device comprises the network adaptor.

In general, in one aspect, the invention relates to a method for managing network access, comprising: issuing, by an application executing in an application virtual machine (AVM), a request for a domain name service (DNS) resolver to resolve a mock fully qualified domain name (FQDN), wherein the mock FQDN is associated with an application service provider (ASP), processing, by a DNS proxy executing in a service virtual machine (SVM), the request in order to obtain a mock Internet Protocol (IP) address, providing, by the DNS proxy, the mock IP address to the application, transmitting, by the application, a first packet comprising the mock IP address, receiving, by a network adaptor, the first packet, obtaining, by the network adaptor, a first policy associated with the mock IP address, and replacing, by the network adaptor, the mock IP address in the first packet with a first IP address to obtain a second packet, wherein the first IP address is associated with a remote server host and is specified in the first policy, transmitting the second packet towards the remote server host, wherein the remote server host is associated with the ASP, after transmitting the second packet: receiving, by the computing device, an updated policy from a management service, updating, based on the updated policy, a first policy to obtain a second policy, wherein the second policy comprises a second mock IP address and is associated with the mock IP address, transmitting, by the application, a third packet comprising the mock IP address, receiving, by the network adaptor, the third packet, obtaining, by the network adaptor, a second policy associated with the mock IP address, and replacing, by the network adaptor, the mock IP address in the third packet with a second mock IP address to obtain a fourth packet, transmitting the fourth packet towards a proxy in the SVM, obtaining, by the proxy, a third policy associated with the second mock IP address, processing, by the proxy, the fourth packet based on the third policy to obtain a fifth packet, transmitting the fifth packet to the network adaptor, and transmitting, by the network adaptor, the fifth packet towards the remote host server, wherein the AVM and the SVM execute on a computing device, wherein the computing device comprises the network adaptor.

In general, in one aspect, the invention relates to method of managing access, comprising receiving, by a management service, a notification from an application service (ASP) provider, in response to the notification, identifying a plurality of deployed applications communicating with the ASP, wherein each of the plurality of applications is executing on one of a plurality of computing devices, transmitting an updated policy to a computing device of the plurality of computing devices, wherein the updated policy specifies at least one IP address that a deployed application of the plurality of deployed applications should use to communicate with the ASP, wherein the deployed application is executing on the computing device.

Other aspects of the invention will be apparent from the following description and the appended claims.

BRIEF DESCRIPTION OF DRAWINGS

FIGS. 1A-1C show systems in accordance with one or more embodiments of the invention.

DETAILED DESCRIPTION

Figure 1B:
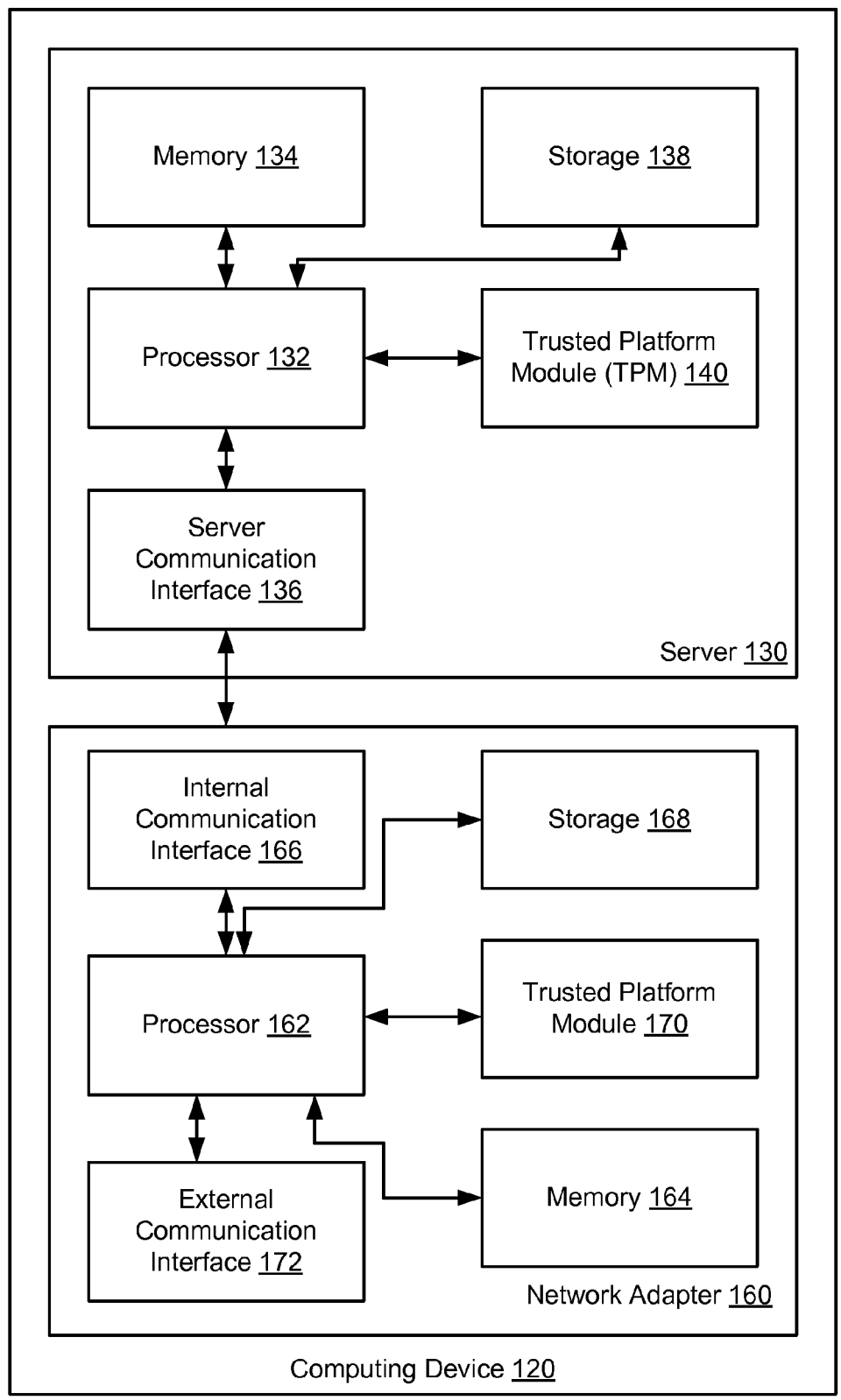

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1A-17, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to a method and system for managing network access for applications. More specifically, embodiments of the invention provide mock Internet Protocol (IP) addresses (described below) to the applications, where the applications may use the mock IP addresses to communicate with other systems (e.g., other computing devices, the management service, or any other system that is accessible via the network). Each mock IP address may be associated with one or more policies, where the policies dictate how packets that includes the mock IP address are processed. The use of mock IP addresses by the application instead of the actual IP address of the system with which the application is communicating may also provide an extra layer of abstraction. Said another way, if the application is compromised by an attacker, the attacker may not be able to obtain information from that application that would allow the attacker to access the systems with which the application is/was communicating. In one embodiment of the invention, the mock IP address may be same as the actual IP address of the remote host server. In such scenarios, the use of the mock IP address may allow for the transparent application of a policy to the packets issued by the application.

In one or more embodiments of the invention, the mock IP addresses may be used to maintain a class of service (CoS) between applications executing on the computing devices and an application service provider (ASP). In one embodiment of the invention, the mock IP addresses and, in particular, the policies associated with the mock IP addresses may be dynamically modified in order to maintain a certain CoS between an application and the ASP (or, more specifically, a remote host server through which the ASP is providing its service). In one embodiment of the invention, the CoS specifies the connectivity between the application and the ASP. For example, the CoS may specify that there may at most ten active connections with an ASP. In a second example, the CoS may specify that application must be able to connect to the ASP 99% of the time. The CoS may specify other requirements without departing from the invention. For example, the CoS may specify a minimum amount of bandwidth that a given application (executing on the computing device) requires and/or that all communications between the application and the ASP require the use of a certain protocol (e.g., TLS, etc.).

In the event that the ASP is the subject of a Denial of Service (DoS) attack or a Distributed DOS (DDoS) attack, the connectivity between the application and the ASP may fall below the agreed upon CoS. In such cases, embodiments of the invention may be used to mitigate the connectivity issues caused by the DoS and DDoS attacks. (See e.g., FIGS. 11-14). Embodiments of the invention may be used to mitigate attacks other than DDOS and DOS attacks without departing from the invention.

Further, embodiments of the invention may also be used to mitigate DoS and DDoS attacks by implementing a scrubbing network (described below) using computing devices. In such cases, the ASP and the management service may take steps to direct network traffic from the ASP to a scrubbing network (e.g., by modifying various Domain Name Service (DNS) records in various authoritative DNS servers). Once the network traffic has been redirected to the aforementioned scrubbing network, the scrubbing network may process the network traffic in order to mitigate the impact of the DDoS attack. Further, the scrubbing network may also be able to provide additional details about the sources of the DDoS attack to the ASP (via the management service). Additional details are provided in FIG. 15.

Further, embodiments of the invention may be used to provide different CoSes to different applications executing on the same computing device, where the applications are communicating with the same remote host server. Additional detail regarding this embodiment may be found, for example, in FIGS. 16 and 17.

FIG. 1A shows a system in accordance with one or more embodiments of the invention. The system includes computing devices (120A-120N) (described, e.g., in FIGS. 1B-1C) operatively connected to a management service (100). In one embodiment of the invention, the management service (100) is any combination of hardware and software that includes functionality to manage one or more computing devices. More specifically, the management service (100) may include one or more servers (each including at least a processor, memory, persistent storage, and a communication interface) executing one or more applications (not shown) that include functionality to manage the computing devices (120A, 120N). The management of the computing devices by the management service may include, but is not limited to, functionality to: configure the computing device, modify the configuration (or operation of) the computing device, verify the integrity of the computing devices (i.e., to determine whether there has been any tampering (of the software and/or hardware) of the computing device), receive data from and/or provide data to the computing devices, provide applications to the computing device, and provide functionality to implement various methods described below (see e.g., FIGS. 11-17).

The management service may communicate with the computing device(s) using any combination of wired and/or wireless communication protocols. Further, the management service may communicate with the management service via a local area network (e.g., an enterprise network, and/or wide area network (e.g., over the Internet)). The communication between the management service and the computing devices may include any combination of secured (e.g., encrypted) and non-secure (e.g., un-encrypted) communication channels. In one or more embodiments of the invention, secure communication is ensured, even in case of a non-secure communication channel. The manner in which the management service and the computing devices communicate may vary based on the implementation of the invention.

In one embodiment of the invention, the computing devices (120A, 120N) may be located within an enterprise. More specifically, the computing devices may be on an enterprise network (i.e., behind the enterprise's firewall).

The management service and one or more of the computing devices may be located in the same physical location (e.g., in the same data center). Alternatively, the management service and one or more of the computing devices may be located in different physical locations. The physical locations of the management service and the computing devices may vary based on the implementation.

As discussed above, the management service includes functionality to verify the integrity of the computing devices. The aforementioned verification may be performed whenever the computing device is powered on, restarted, etc. and at any other point at which the management service determines it is necessary (e.g., based on a policy implemented by the management service) to verify the integrity of the computing device.

The following is an example of the integrity verification performed by the management service when a computing device is powered on. The example is not intended to limit the invention. Turning to the example, consider a scenario in which a computing device is configured and then subsequently shipped to a user to be installed into their enterprise network. Once the computing device has been installed in the enterprise network, the computing device is powered on and the integrity verification for the computing device is initiated. In this example, through the integrity verification processes, the computing device needs to provide to the management service serial numbers (or other identification numbers) for one or more hardware components (see e.g., FIG. 1B) in the computing device) and perform a series of integrity measurements of the software that is present on the computing device (e.g., the BIOS, executable code in the ROM, platform and motherboard configuration data, operating system software, virtualization software, applications, etc.). In one embodiment of the invention, each of the integrity measurements is a cryptographic hash (e.g., SHA-256 hash) of the software being measured. The integrity measurements may be obtained in accordance with one or more Trusted Computing Group Trusted Platform Module specifications. Other methods for performing integrity measurements may be implemented without departing from the invention.

Returning to the example, once the serial numbers and the integrity measurements are provided to the management service, the management service verifies the aforementioned information. If the verification is successful, then the integrity of the computing device has been verified. At this point, the management service may permit the computing device to complete the boot process. More specifically, in one embodiment of the invention, the computing device's functionality may be limited until its integrity has been successfully verified. Accordingly, prior to successful verification, the computing device may only perform the functions that are required to enable its integrity verification. All other functionality may be disabled, e.g., the computing device cannot execute any other operating system or applications, the computing device cannot communicate with any other remote system except the management service, etc.

Continuing with the discussion of FIG. 1A, in one embodiment of the invention, each of the computing devices includes functionality to execute one or more applications (discussed below, see e.g., FIG. 1C). Further, each of the computing devices may include functionality to interact with other computing devices, the management service, and/or other systems (i.e., systems that are operatively connected to the computing device).

FIG. 1B shows a system in accordance with one or more embodiments of the invention. In one or more embodiments of the invention, computing device (120) includes two components: a server (130) and a network adapter (160). Each of these components is described below.

Figure 1C:
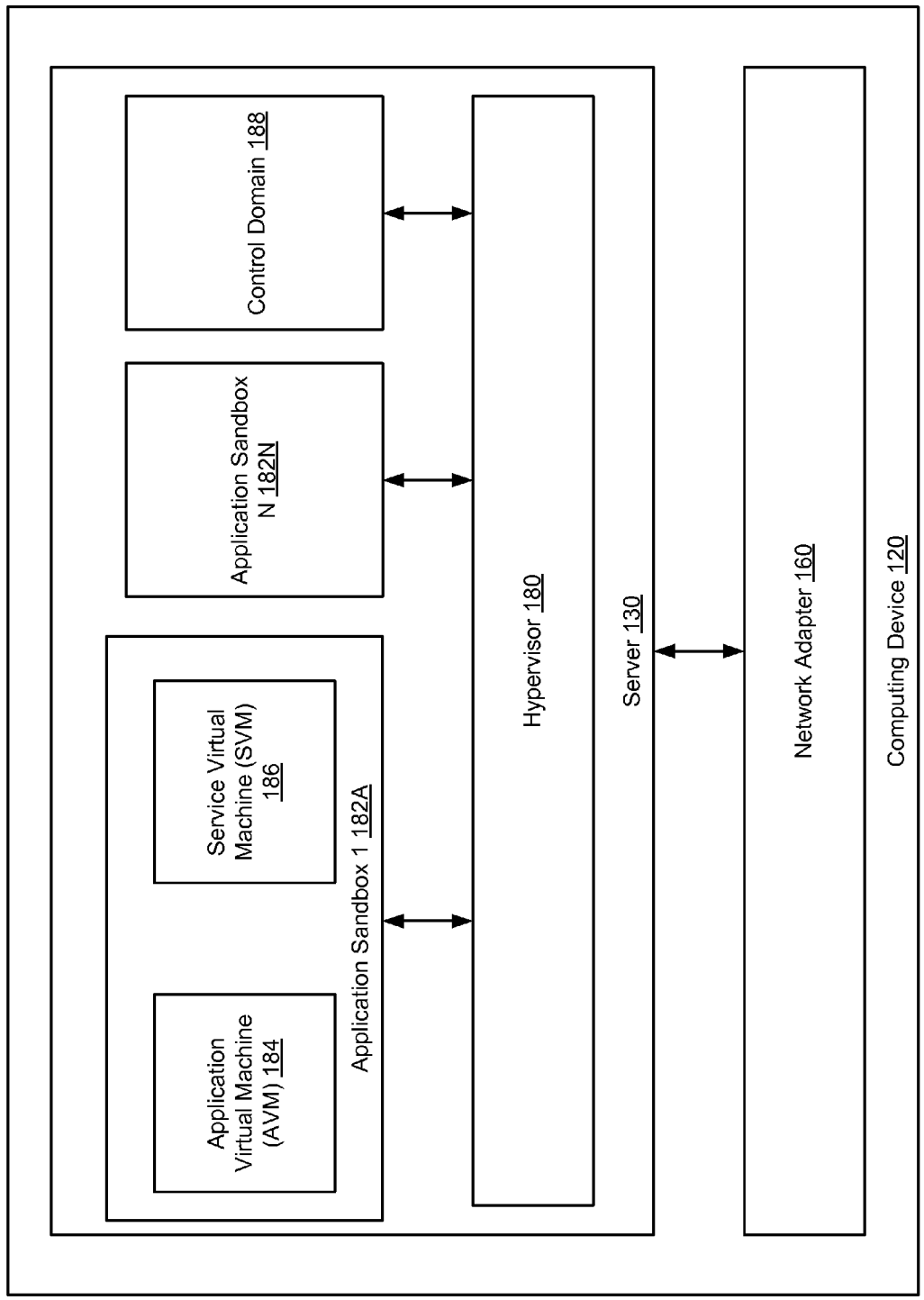

In one embodiment of the invention, the server (130) may include functionality to execute applications, virtual machines, and one or more operating systems (see e.g., FIG. 1C). The server (130) may include a processor (132), memory (134), a server communication interface (136), storage (138), and a trusted platform module (140). Each of these components is described below.

In one embodiment of the invention, the processor (132) is a group of electronic circuits with a single core or multi-cores that are configured to execute instructions. In one embodiment of the invention, the processor may be implemented using a Complex Instruction Set (CISC) Architecture or a Reduced Instruction Set (RISC) Architecture.

In one embodiment of the invention, the memory (134) corresponds to any volatile memory including, but not limited to, Dynamic Random-Access Memory (DRAM), Synchronous DRAM, SDR SDRAM, and DDR SDRAM.

In one embodiment of the invention, the server communication interface (136) enables communication between the server (130) and the network adapter (160). The server communication interface may provide the only path through which the server and the network adapter may communicate. Accordingly, the server may not directly access any other component of the network adapter (160). The server communication interface (136) may use any of the following protocols to communicate with the network adapter: Peripheral Component Interconnect (PCI), PCI-Express (PCIe), and PCI-eXtended (PCI-X), Non-Volatile Memory Express (NVMe). Those skilled in the art will appreciate that the invention is not limited to the aforementioned protocols.

In one embodiment of the invention, the storage (138) corresponds to any persistent (non-volatile storage). The storage (138) may include any combination of the following: magnetic storage, optical storage, NAND Flash memory, NOR Flash memory, Magnetic RAM Memory (M-RAM), Spin Torque Magnetic RAM Memory (ST-MRAM), Phase Change Memory (PCM), memristive memory, or any other memory defined as a non-volatile Storage Class Memory (SCM). Those skilled in the art will appreciate that embodiments of the invention are not limited to aforementioned types of storage.

In one embodiment of the invention, the trusted platform module (140) (which may also be referred to as hardware security module) is a microprocessor that includes a cryptographic processor, a secure input/output (IO) interface, persistent memory (which may store various cryptographic keys), and volatile memory (which may store integrity measurements and cryptographic keys). In one embodiment of the invention, the cryptographic processor may include functionality to encrypt and decrypt data, generate random numbers, generate cryptographic keys (e.g., public-private key pairs, symmetric keys, etc.), and generate hash values (e.g., using SHA-256). The trusted platform module may be implemented in a manner that conforms to one or more Trusted Computing Group Trusted Platform Module specifications.

In one embodiment of the invention, the network adapter (160) includes functionality to control and/or provide network access between the server and other entities that are external to the computing device (e.g., other computing devices, the management services, and other systems (described above)). The network adapter may also include functionality to control the server's hardware resets and boot behavior. The network adapter (160) may include a processor (162), memory (164), an internal communication interface (166), storage (168), a trusted platform module (170), and an external communication interface (172). Each of these components is described below.

In one embodiment of the invention, the processor (162) is a group of electronic circuits with a single core or multi-cores that are configured to execute instructions. In one embodiment of the invention, the processor may be implemented using a Complex Instruction Set (CISC) Architecture or a Reduced Instruction Set (RISC) Architecture.

In one embodiment of the invention, the memory (164) corresponds any volatile memory including, but not limited to, Dynamic Random-Access Memory (DRAM), Synchronous DRAM, SDR SDRAM, and DDR SDRAM.

In one embodiment of the invention, the internal communication interface (166) enables communication between the server (130) and the network adapter (160). The internal communication interface may provide the only path through which the server and the network adapter may communicate. Accordingly, all communication from the server (130) and to the server (130) passes through the internal communication interface (166) The internal communication interface (166) may use any of the following protocols to communicate with the network adapter: Peripheral Component Interconnect (PCI), PCI-Express (PCIe), and PCI-eXtended (PCI-X), Non-Volatile Memory Express (NVMe). Those skilled in the art will appreciate that the invention is not limited to the aforementioned protocols.

In one embodiment of the invention, the storage (168) corresponds to any persistent (non-volatile storage). The storage (168) may include any combination of the following: magnetic storage, optical storage, NAND Flash memory, NOR Flash memory, Magnetic RAM Memory (M-RAM), Spin Torque Magnetic RAM Memory (ST-MRAM), Phase Change Memory (PCM), memristive memory, or any other memory defined as a non-volatile Storage Class Memory (SCM). Those skilled in the art will appreciate that embodiments of the invention are not limited to aforementioned types of storage.

In one embodiment of the invention, the trusted platform module (170) (which may also be referred to as hardware security module) is the same or substantially similar to the TPM (140) described above.

In one embodiment of the invention, the external communication interface (172) enables the computing device (120) to communicate with the management service, other computing devices, or other systems (described above). The external communication interface may be implemented in accordance with the Ethernet standard (i.e., the external communication interface may include one or more Ethernet ports). Other communication standards may be used without departing from the invention.

In one embodiment of the invention, the network adapter (160) may include functionality to implement various secure communication protocols such as Internet Protocol Security (IPSec), Secure Sockets Layer (SSL), and Transport Layer Security (TLS). Further, the network adapter (160) may include functionality to perform various cryptographic functions on behalf of the server (or processes executing therein). For example, the network adapter (160) may include one or more FPGAs, one or more ASICs, etc. that that may be used to perform encryption and decryption functions on behalf of the processes executing in the server.

As discussed above, the computing devices include functionality to obtain integrity measurements that are used by the management service in order to verify the integrity of the computing device. In one embodiment of the invention, the server (using TPM (150)) and the network adapter (using TPM (170)) are each responsible for obtaining integrity measurements for the software executing therein. The management service, upon receiving the aforementioned measurements, may then verify the integrity of the server and network adapter independently. Further, the management service may only permit applications and virtual machines to execute on the computing devices if both the integrity of the server (130) and the integrity of the network adapter (160) have been verified. In certain scenarios, if the integrity of either the network adapter or the server cannot be verified, then the computing device may cease operating (or initiate some other remedial action).

In one embodiment of the invention, the network adapter may limit the server's use of the external communication interface (172) until the server's integrity has been verified. In such scenarios, the server (130) may only be able to access the management service via the external communication interface until the integrity of the server has been verified.

FIG. 1C shows a logical view of the computing device in accordance with one or more embodiments of invention. As shown in FIG. 1C and previously discussed, the computing device includes a server (130) and a network adapter (160). Further, the server (130) may have thereon one or more of the following components: a hypervisor (180), a control domain (188), and one or more application sandboxes (182A, 182N). Each of these components is described below.

In one embodiment of the invention, the control domain (188) is a virtual machine that includes an operating system (e.g., Security-Enhanced Linux). The control domain provides an isolated execution environment for processes/services executing within the control domain. The control domain (via the services executing therein) manages other virtual machines (discussed above) executing on the server (130). Management of the virtual machines may include, but is not limited to, instantiating virtual machines, halting execution of virtual machines on the server, providing various services to virtual machines (e.g., key management, backend processing of various protocol proxies executing in the service virtual machines (discussed below), etc.), and obtaining and enforcing policies related to the operation of the virtual machines in one or more application sandboxes.

In one embodiment of the invention, an application sandbox (182A, 182) includes one or more service virtual machines (SVM) (186) and one or more application virtual machines (AVMs) (184). Each of the SVMs and the AVMs is an isolated executing environment that includes its own operating system (e.g., Linux, Security-Enhanced Linux, or Windows). In embodiment of the invention, each AVM is associated with one SVM but each SVM may be associated with multiple AVMs. Each AVM includes functionality to execute one or more applications (including $3^{rd}$ party applications). In one embodiment of the invention, the applications and/or processes executing within the AVM are only able to directly communicate with the associated SVM. The SVM may, based on one or more policies, permit the applications and/or processes within the AVM to access resources (software resources and/or hardware resources) in the server and/or the network adapter. In other embodiments of the invention, certain applications and/or processes in the AVM may (in certain scenarios) directly access resources in the server and/or network adapter. In such cases, the system may implement a policy which dictates when the applications/processes in an AVM can directly access the resources in the server and/or the network adapter and when the applications/processes are required to communicate with the SVM, which in turn communicates with the resources on the server and/or network adapter.

Continuing with the discussion of FIG. 1C, the SVM includes functionality to provide various services to the associated AVMs. These services may include, but are not limited to, various network services such as DHCP, ARP, DNS, and various file system services (i.e., services to access data that is external to the AVM). The services provided by the SVM to the AVM may be implemented as proxy services within the SVM. More specifically, from the perspective of the AVM, the proxy services provided by the SVM are the actual services. However, the proxy services provided by the SVM may be modified versions of the actual services, where the modification to the actual services may include modifications that limit access to the actual services or change the behavior of the actual services. In one embodiment of the invention, the control domain may perform various levels of processing to assist the SVM in implementing one or more proxy services. For example, in certain scenarios the proxy service is completely implemented in the SVM while in other scenarios a portion of the proxy service is implemented in the SVM while another portion of the proxy service is implemented in the control domain. Additional details about the various proxy services are provided below (see e.g., FIG. 4).

In one embodiment of the invention, the hypervisor (180) provides the interface between the hardware resources on the server (see e.g., FIG. 1B) and the virtual machines (e.g., control domain, SVMs, AVMs, etc.) executing on the server. The hypervisor executing on the server (130) may be, for example, a Xen hypervisor, a kernel-based virtual machine (KVM), or VMware ESXi.

Figure 2:
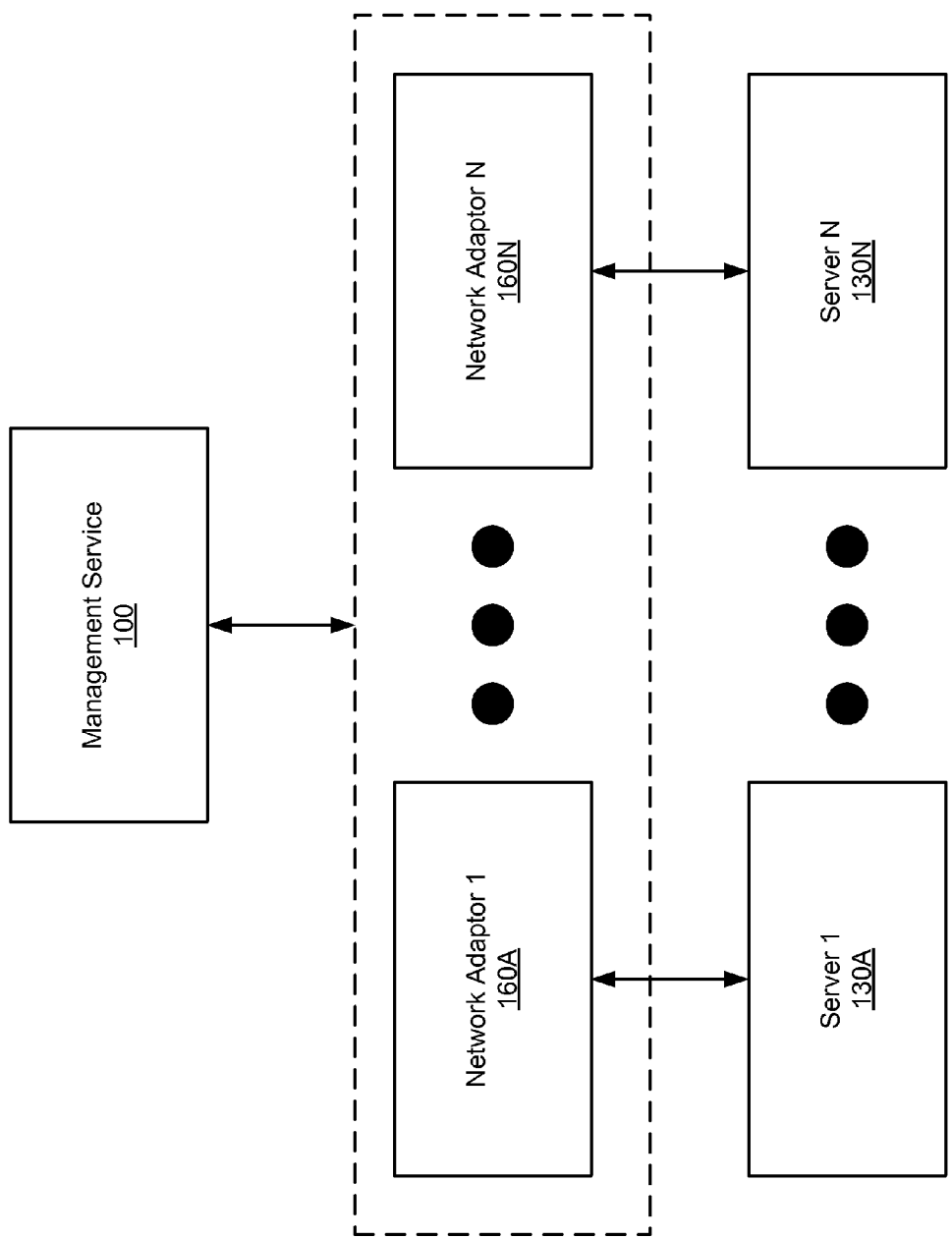
FIG. 2 shows a system in accordance with one or more embodiments of the invention.

FIG. 2 shows an alternate configuration of the system in accordance with one or more embodiments of the invention. In the system shown in FIG. 2, the servers (130A, 130B) and the network adapters (160A, 160B) are physically separate components as opposed to two components located within a single physical system (i.e., in computing device (120)).

Figure 3:
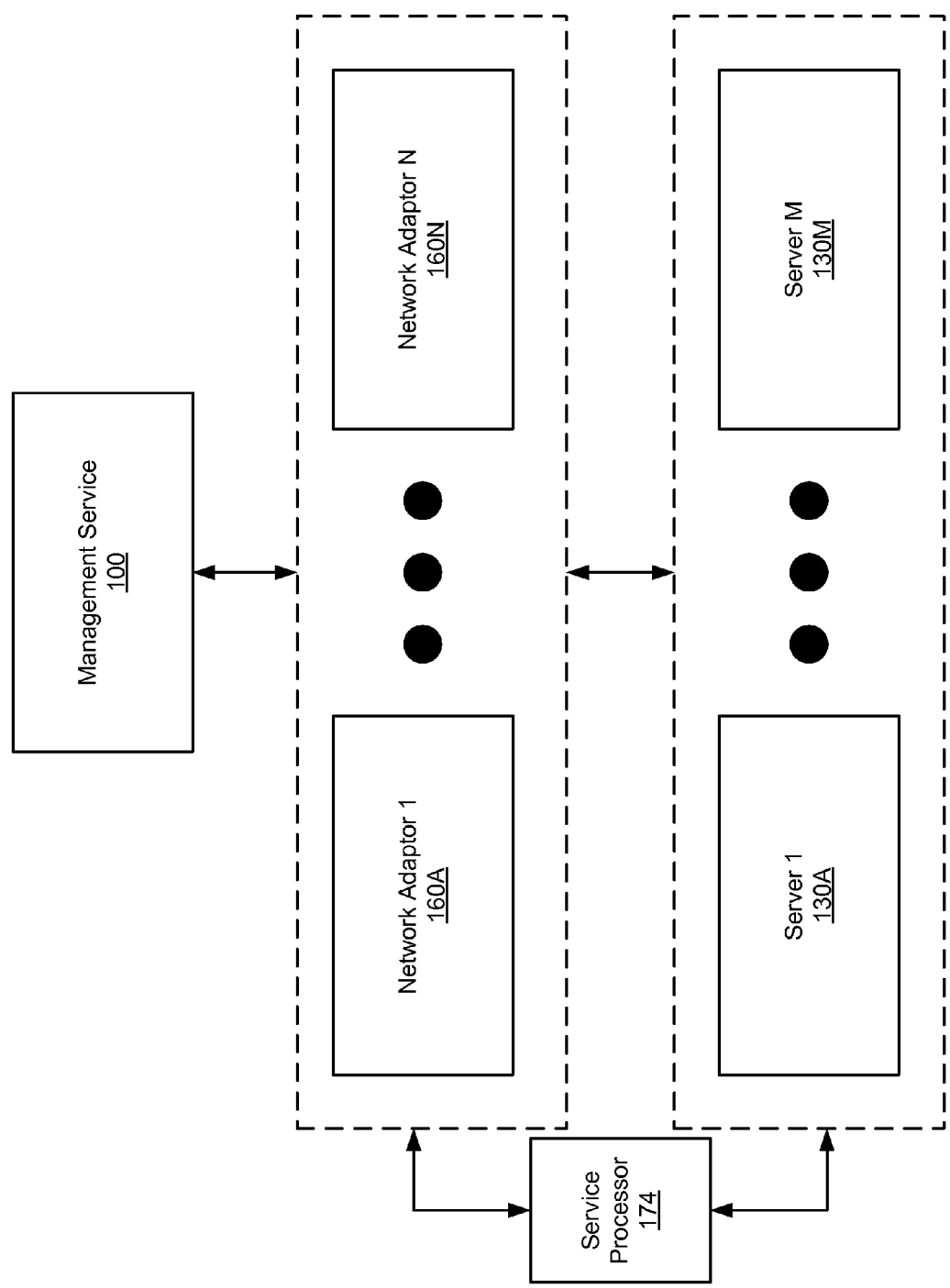
FIG. 3 shows a system in accordance with one or more embodiments of the invention.

FIG. 3 shows an alternate configuration of the system in accordance with one or more embodiments of the invention. In the system shown in FIG. 3, the servers (130A, 130M) and the network adapters (160A, 160N) are physically separate components as opposed to two components located within a single physical system (i.e., in computing device (120)). Further, instead of a 1:1 relationship between servers and network adapters, there may be n:1 relationship between servers and network adapters. In certain scenarios, a single server may be associated with multiple network adapters. The server(s) and the network adapter(s) may be connected via a switching fabric (176). The switching fabric (176) may directly connect the server(s) with the network adapter(s), or it may include network devices (e.g., routers and/or switches) that establish indirect connections between the server(s) and the network adapter(s). In one embodiment of the invention, a service processor (174) may be used to manage the interaction and/mapping between the servers and network adapters i.e., the service processor (174) may assign network adapters (160A-160N) to servers (130A-130N), for example, based on availability, bandwidth and redundancy considerations.

In one embodiment of the invention, the system described in FIGS. 1A-3 above may include an application running in an application virtual machine (AVM) (184) that needs to interact with other applications or services that are located elsewhere. FIGS. 4-17 describe various embodiments of the invention that enable applications within an AVM to interaction with applications or services external to the AVM.

In one embodiment of the invention, the system described in FIGS. 1A-3 above may include an application running in an application virtual machine (AVM) (184) that needs to interact with other applications or services that are located elsewhere. FIGS. 4-10 describe various embodiments of the invention that enable applications within an AVM to interaction with applications or services external to the AVM.

Figure 4:
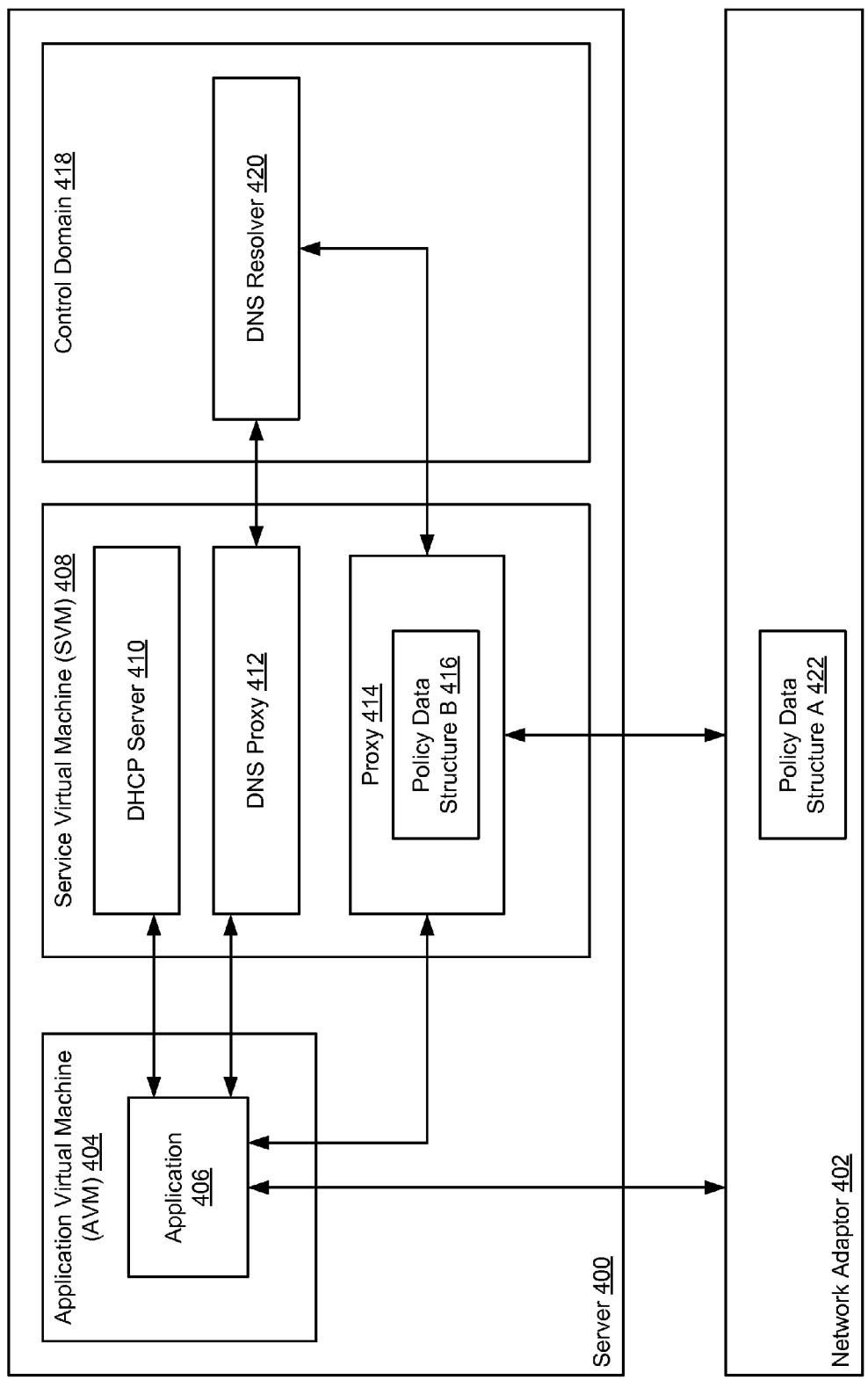
FIG. 4 shows a system in accordance with one or more embodiments of the invention.

FIG. 4 shows various components of the system previously described in FIGS. 1A-3 that may be used to manage network access for applications in an AVM. Other components of the system (while present) are omitted from FIG. 4 for purposes of clarity.

Turning to FIG. 4, in one embodiment of the invention, the computing device (or more specifically components executed therein) is configured such that the application (406) in the AVM (404) may only communicate with a select number of components that are external to the AVM (404). For example, the application (406) may communicate with certain components in the SVM (408) and the application (406) may also communicate with the network adaptor (402). However, the application may not directly communicate with the control domain (or any components executing therein). With respect to the application's communication with processes executing in SVM, the application may be configured such that its communication is limited to interacting with the DHCP server (410), the domain name service (DNS) proxy (412), and one or more proxies (414).

In one embodiment of the invention, the Dynamic Host Configuration Protocol (DHCP) server (410) executes in the SVM and implements DHCP. In particular, the DHCP server may provide an IP address to the AVM, where the IP address is used as a source IP address in packets transmitted from the AVM. The DHCP server may including functionality to provide the AVM (or applications executing therein) the IP address of the DNS proxy (412) (see e.g., FIG. 6). In addition, the DHCP server may also implement web proxy auto-discovery protocol (WPAD) (see e.g., FIG. 9).

In one embodiment of the invention, the DNS proxy (412) appears to the application as a DNS resolver (i.e., a service that resolves a fully qualified domain name (FQDN) to an IP address). However, the DNS proxy (412) does not include functionality to resolve FQDNs; rather, the DNS proxy (412) serves as an intermediary between the application and the DNS resolver (420) in the control domain.

In one embodiment of the invention, the DNS resolver (420) includes functionality to resolve FQDNs to corresponding IP addresses. The IP address that the DNS resolver provides to the DNS proxy may be a mock IP address (see e.g., FIGS. 5 and 7A). In one embodiment of the invention, the mock IP address is an IP address that conforms to Internet Protocol version 4 (IPv4) or IP version 6 (IPv6). However, the mock IP address is used to determine how to process packets that include the mock IP address as the destination IP address in the IP header of the packet (see e.g., FIGS. 6-7B). The DNS resolver may also include functionality to: (i) trigger the identification/selection of a mock IP address and (ii) trigger the population of one or more policy data structures (416, 422) (see e.g., FIG. 7, 706).

In one embodiment of the invention, populating the policy data structure(s) may include generating an entry, where the entry includes a mock IP address and a policy. The entry, once generated by the control domain, is provided to the network adaptor or the appropriate component in the SVM. The mock IP address may be selected from a pool (or set) of available IP addresses, may be specified by the management service, and/or specified by a user. The mock IP addresses may be selected in such a manner as to ensure that they do not conflict with other IP addresses that are used in the computing device.

In one embodiment of the invention, the number of entries generated by the control domain and the placement of the entries may vary based on the manner in which the packets from the application are to be processed. For example, if the mock IP address is only used to abstract the actual IP address of the remote host server with which the application is attempting to connect such that application is not aware of the actual IP address of the host server, then a single entry may be created and stored in a policy data structure (422) in the network adaptor (402). The single entry may be indexed using the mock IP address and may include a policy that specifies that the mock IP address in the packet should be replaced with an IP address included in the policy (i.e., the IP address of the remote host server). An example of how packets may be processed using multiple entries in accordance with one or more embodiments of the invention is provided below in FIG. 8.

Continuing with the discussion of FIG. 4, as discussed above, the SVM may include proxies (414) (also referred to as proxy services). In certain instances the processing of the packets issued by the AVM may need to be processed (based on the policy being applied to the packets) by a proxy. In certain embodiment of the invention, the use of the proxy to process packets issued by the AVM is transparent to AVM (i.e., the AVM and/or applications executing therein are not aware that a proxy is being used) (see e.g., FIGS. 6-8). In other embodiments of the invention, the application (or AVM) is able to directly connect to the proxy (414) (see e.g., FIGS. 9-10). In such scenarios, the proxy is not transparent to the AVM (or application executing therein). Depending on the implementation of the invention, the proxy (414) may also include functionality to communicate to the DNS resolver in the control domain in order to obtain a mock IP address. The proxy's interaction with the DNS resolver may be performed in a manner that is transparent to the AVM (and/or applications executing therein).

In one or more embodiments of the invention, the policies included within the entries may include any level of complexity. Further, a policy may be dependent on a number of factors including the state of the computing device (and/or the state of a component executing therein or located therein). The following describes some exemplary policies that may be included within the computing device. The examples are not intended to limit the scope of the invention. Example policies: replace the mock IP address in the packet with an actual IP address; limit bandwidth utilization of an application (or AVM) based on the source IP address of the packet; require packets with a given mock IP address to be further processed by a proxy in the SVM (see e.g., FIG. 8); limit the number of connections to a particular IP address(es); impose time of day on reachability of a particular destination IP address(es); merge multiple connections to an IP address(es) into a single pipelined connection using multiplexing; direct packets that match a specific criteria to a traffic inspection engine or to another location (e.g., a honey pot); mirror packet and send copy of packet to another location for storage; filter packet based on payload content (and optionally rewrite payload content), require use of a certain encryption algorithm (or cryptographic suite) be applied to the packet (or a portion thereof), and/or ban use of a certain encryption algorithm (or cryptographic suite) be applied to the packet (or a portion thereof).

Figure 5:
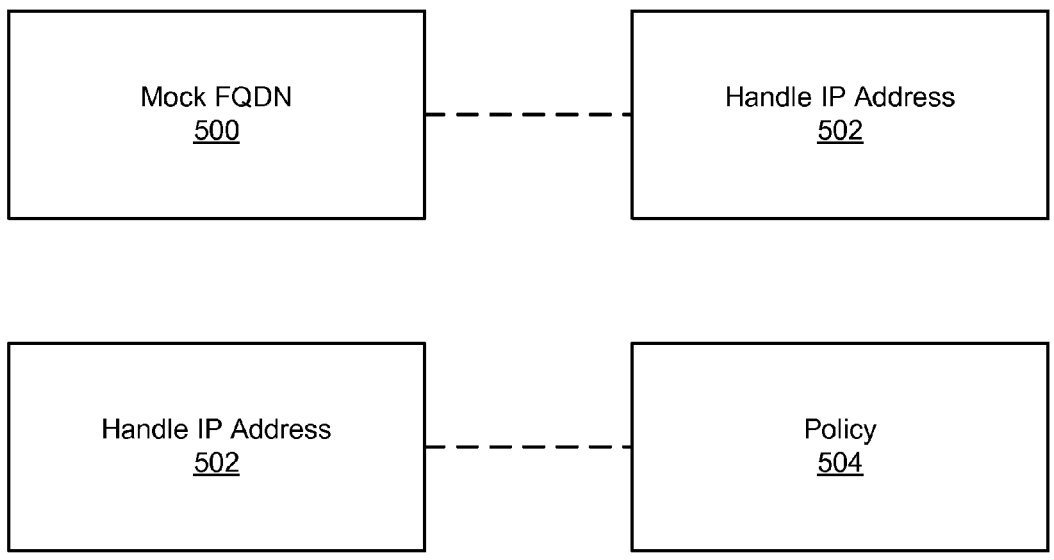
FIG. 5 shows relationships between various components in the system in accordance with one or more embodiments of the invention.

FIG. 5 shows relationships between various components in the system in accordance with one or more embodiments of the invention. In one embodiment of the invention, the application may attempt to contact a remote host server using a pre-configured mock FQDN. From the perspective of the application (FIG. 4, 406), the mock FQDN appears to be the FQDN for the remote host server that the application is attempting to contact. However, the mock FQDN is used, at least in part, in order to determine the mock IP address that is generated by the control domain and then ultimately provided to the application. For example, the mock FQDN may be application.secure_system.com and where the FQDN for the remote host server is actually foo.com. The use of the mock FQDN limits the information that the application knows about the remote host server to which the application is attempting to connect. The application is unable to determine that the mock FQDN is not the actual FQDN for the remote host server. In one embodiment of the invention, a single FQDN may be associated with multiple mock FQDNs. In such scenarios, different policies may be applied to packets destined for the same remote host server based on which mock FQDN was used to connect to the remote host server.

In one embodiment of the invention, the DNS resolver (or another process in the control domain or in the management service) associates the mock FQDN with a mock IP address. The mock FQDN (500)-mock IP address (502) mapping may be statically set. Alternatively, when the mock FQDN is received by the DNS resolver (or another process in the control domain or in the management service), the mock IP address is dynamically selected from a pool of mock IP addresses. Alternatively, the mock IP address may be dynamically generated. In one embodiment of the invention, the management service may provide the mock FQDN to the application. Further, the MOCK FQDN may be used to identify a particular application (e.g., mock FQDN is application_I.secure_systems.com) and or to identify a type of application (e.g., mock FQND is database_app.secure_systems.com).

In one embodiment of the invention, each of the mock IP addresses (502) is associated with a policy (504). The policy may be of arbitrary complexity. Further, the mock IP address (502)-policy (504) mapping may be statically defined or it may be dynamically created. For example, the DNS resolver (or another process in the control domain or in the management service) may have a set of possible policies that may be mapped to the mock IP address and the selection of the particular policy may be determined at runtime based, in part, on the mock FQDN and on the current state of the computing device (or the current state of a component located in or executing therein). The following are examples of state information that may be used to impact the selection of the appropriate policy to apply. The examples are not intended to limit the scope of the invention. Examples of state information: time of day, failure to make use of a returned address, determination (based on, e.g., behavioral analysis) that the AVM (or the application) has been compromised, determining that the computing device (or a portion thereof) is subject to port knocking, determining that a failure to honor TTL on a returned DNS record, and a result of a measure of guest process using a virtual TPM. Embodiments of the invention, enable a policy to applied to packets issued by an application in a manner that is transparent to the application. Said another way, from the perspective of the application, the application is unaware that a policy is being applied to packets issued by the application.

Figure 6:
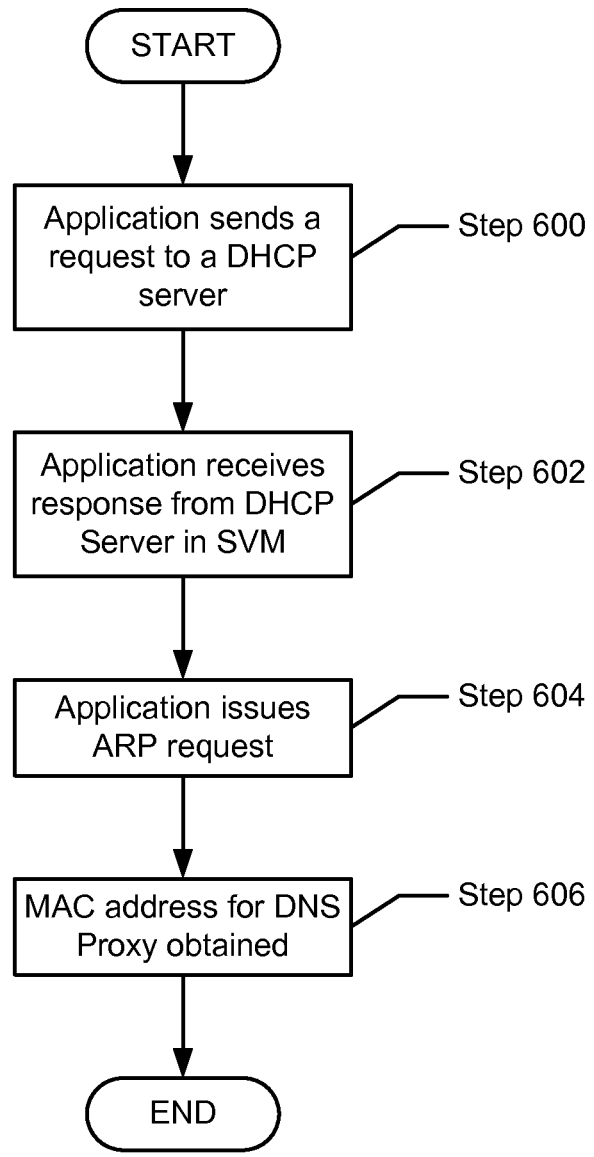
FIGS. 6-7B show flowcharts in accordance with one or more embodiments of the invention.
Figure 7A:
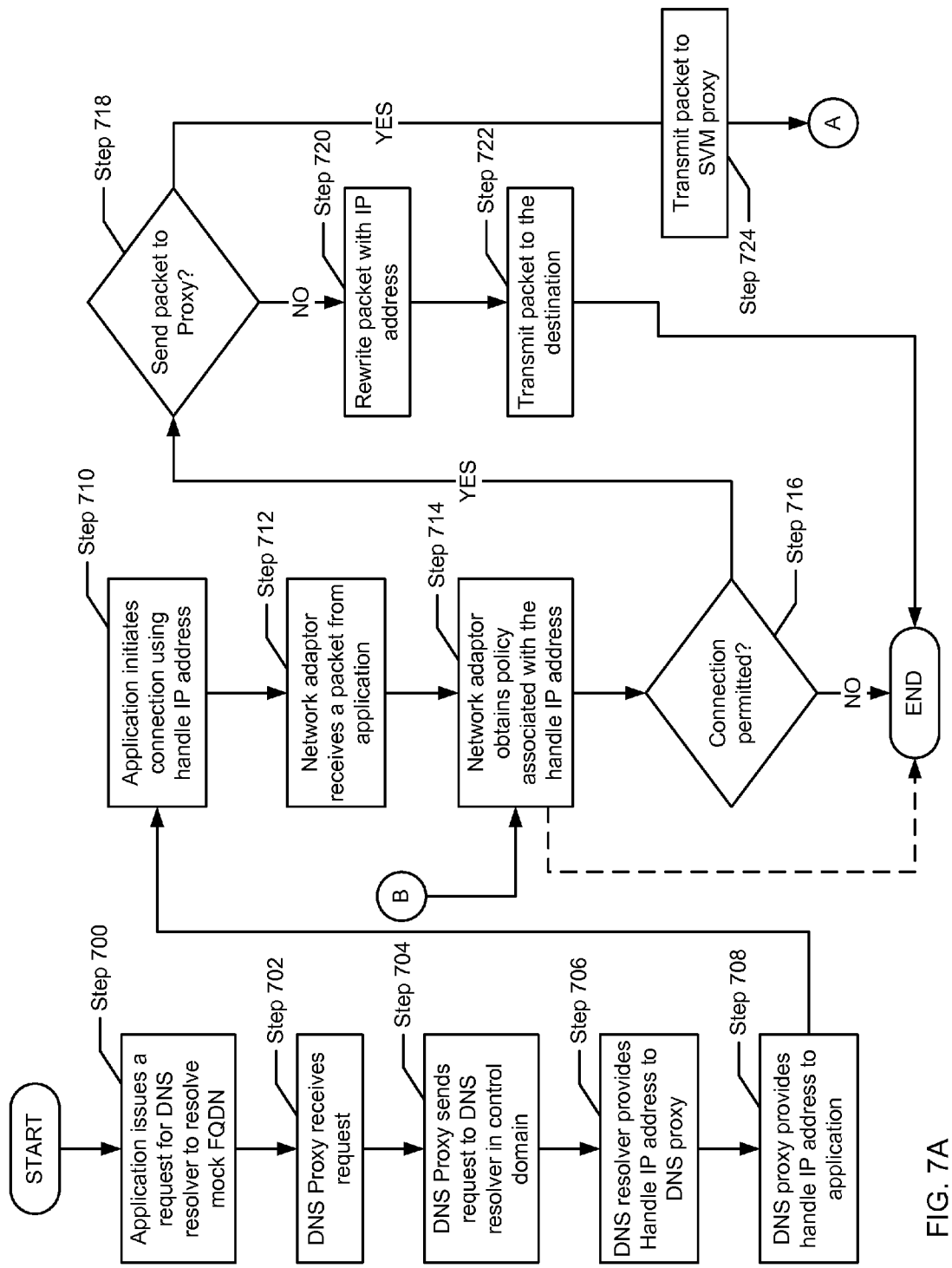
Figure 7B:
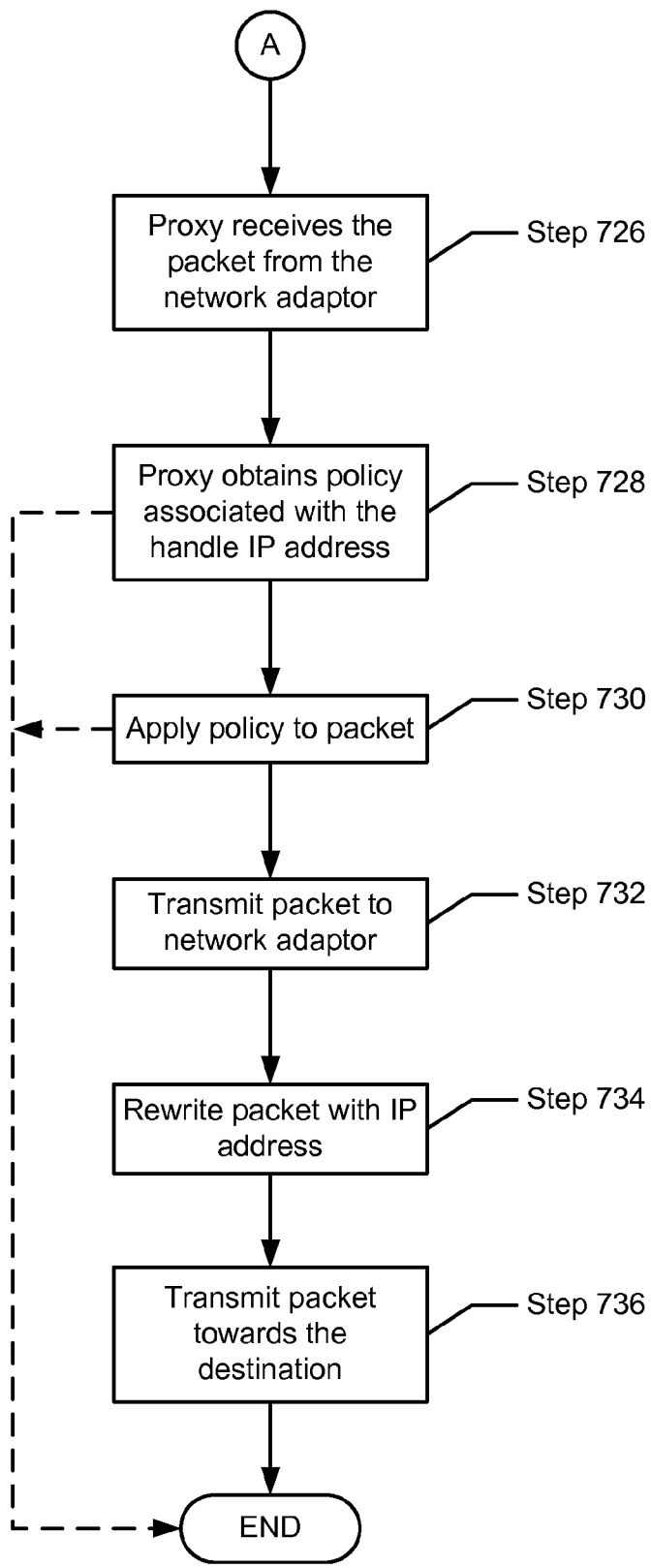

FIGS. 6-7B show flowcharts in accordance with one or more embodiments of the invention.

While the various steps in the flowcharts are presented and described sequentially, one of ordinary skill will appreciate that some or all of these steps may be executed in different orders, may be combined or omitted, and some or all of the steps may be executed in parallel. In one embodiment of the invention, the steps shown in FIGS. 6-7B may be performed in parallel without departing from the invention.

FIG. 6 shows a method for obtaining information to enable the application to connect to the DNS proxy in accordance with one or more embodiments of the invention.

In step 600, an application sends a request to a DHCP server to obtain the IP address of a DNS resolver.

In step 602, the application receives the IP address of the DNS proxy in response to the request issued in step 600. The application is unaware that the IP address received from the DHCP server is the IP address of a DNS proxy and not the IP address of the actual DNS resolver. Steps 600-602 may be performed by another process in the AVM without departing from the invention. More specifically, the AVM (or a process therein) may use DHCP in order to obtain an IP address for the AVM and the IP address for the DNS resolver.

In step 604, the application issues are ARP request that includes the IP address of the DNS proxy.

In step 606, a media access control (MAC) address for the DNS proxy is received in response to the request in Step 604. In one embodiment of the invention, if the IP address is an IPv6 address then the MAC address of the DNS resolver may be determined using Neighbor Discovery Protocol instead of ARP. In one embodiment of the MAC address may be mock MAC address that is generated by a process on the computing device, by the management service, or a user. The application (and the AVM) is not able to determine that the MAC address is a mock MAC address.

At this stage, the application includes the information required to initiate a connection to a remote host server.

FIGS. 7A-7B shows a method for processing packets issued by the application in accordance with one or more embodiments of the invention. More specifically, FIGS. 7A-7B describe a method that is performed when an application attempts to connect to (or otherwise communicate with) a remote host server.

In step 700, application issues a request for the DNS resolver to resolve a mock FQDN. More specifically, the application has been pre-configured to use the mock FQDN to access the remote host server. From the perspective of the application, the mock FQDN is the actual FQDN for the remote host server.

In step 702, the DNS proxy in the SVM receives the request from step 700.

In step 704, the DNS proxy sends the request to the DNS resolver in the control domain.

In step 706, the DNS resolver processes the request to obtain a mock IP address. In one embodiment of the invention, there is a pre-configured mapping between mock FQDN and the mock IP address, where the pre-configured mock IP address is associated with a policy (described above). In such cases, the DNS resolver uses the mock FQDN to directly identify the mock IP address. In other instances, the mock IP address is dynamically selected. For example, the mock IP address may be part of a pool of mock IP addresses, where each of the mock IP addresses is associated with a separate policy (e.g., Mock IP address 1-policy 1; mock IP address 2-policy 2, etc.). In such cases, the DNS resolver (or another process in the control domain) identifies the appropriate policy to apply to the packets issued by the application for the remote host server (i.e., for packets that the application is attempting to send to the remote host server). In such scenarios, a policy is selected from the pool of policies, where the selection of policies may be based, at least in part, one of the mock FQDN and/or the state of the computing device (or on the state of at least one component therein). Based on this selection, the corresponding mock IP address is selected. The DNS resolver may then send this selected mock IP address back to the DNS proxy.

In another embodiment of the invention, there is a pool of policies and a pool of mock IP addresses (i.e., mock IP addresses that are not currently associated with any policies). In such scenarios, a policy is selected from the pool of policies, where the selection of policies may be based, at least in part, on one of the mock FQDN and/or the state of the computing device (or at least one component therein). Once the policy has been selected, a mock IP address from the pool of mock IP addresses is selected and associated with the selected policy. The selected mock IP address is then sent to the DNS proxy.

In one embodiment of the invention, the resolution of the mock FQDN may result in multiple mock IP addresses being generated. In the event that multiple mock IP addresses are generated, only one mock IP address is provided to the DNS proxy while the other mock IP addresses are used in entries in other policy data structures. An example of generating multiple mock IP addresses is described below in FIG. 8.

Continuing with the discussion of step 706, once the mock IP address(es) is determined, one or more entries are created, where each of the entries includes a mock IP address and the corresponding policy. The entries are then distributed to the appropriate components in the computing device, where these components populate their policy data structures. The number of entries generated in step 706 may vary based upon the complexity of the policies being applied to the packets issued by the application. An example of populating various policy data structures is described with request to FIG. 8.

Continuing with the discussion of FIG. 7, in step 708, the mock IP address is provided to the application.

In step 710, the application initiates (or attempts to initiate) a connection to the remote host server using the mock IP address. As part of step 710 at least one packet that includes the mock IP address as the destination IP address is issued by the AVM to the network adaptor.

In step 712, the network adaptor receives the packet from the AVM.

In step 714, the network adaptor obtains the policy associated with the mock IP address, where the mock IP address is extracted from the header of the packet received from the AVM. In one embodiment of the invention, the network adaptor performs a look-up of its policy data structure to identify an entry that includes the mock IP address. If there are no entries in the policy data structure, then the packet is dropped. As discussed above, the policy data structures are only populated with entries that include a given mock IP address after the DNS resolver (or another process in the control domain) identifies the mock IP address to provide to the DNS proxy after receiving a request to resolve the mock FQDN. Accordingly, the network adaptor may only apply the policy to packets issued by applications that have first issued a request to the DNS proxy to resolve the mock FQDN. Once the policy is received, the policy is applied to the packet (see steps 716-724).

In step 716, the first step in processing the packet is to determine whether the connection is permitted. If the result of applying the policy to the packet results in the connection not being permitted, then the process ends. Specifically, the policy may specify various conditions that must be satisfied in order to permit the application to connect to the remote host server. If the conditions are not satisfied, then the packet may be dropped and the process ends. Otherwise, the process proceeds to step 718.

In step 718, the policy may dictate whether the packet must be processed by a proxy or if the packet may be sent to the remote host server without processing by a proxy. If the packet does not require processing by a proxy, the process proceeds to step 720; otherwise, the process proceeds to step 724.

In step 720, the mock IP is replaced with an actual IP address of the remote host server in order to generate a rewritten packet. The actual IP address of the remote host server may be present in the entry associated with the mock IP address (i.e., the policy obtained in step 714).

In step 722, the rewritten packet (which includes the remote host server IP address as the destination IP address) is then transmitted towards the remote host server.

If the policy dictates that the packet is to be processed by a proxy, then in step 724, the packet is transmitted to the appropriate proxy in the SVM. In one embodiment of the invention, the packet is transmitted to the proxy SVM without any modification (or at least without any modification to the destination IP address, i.e., the destination IP address of the packet is the mock IP address). In another embodiment of the invention, the mock IP address in the packet is replaced with a second mock IP address.

In step 726, the proxy (which was identified in the policy obtained in step 714) receives the packet that was transmitted in step 724.

In step 728, the proxy obtains a policy based on the mock IP address that is present in the packet received in step 726. In one embodiment of the invention, the mock IP that is present in the received packet is the mock IP address that was originally provided to the application in step 708. Alternatively, the mock IP address is a second mock IP address, where the original mock IP address was replaced with the second mock IP address by the network adaptor prior to the packet being transmitted to the proxy. In either scenario, the mock IP address (or the second mock IP address) may be included as the destination IP address in the IP header of the packet received in step 726. The mock IP address (or the second mock IP address, if present) is used to identify an entry in a policy data structure that is located within (or accessible to) the proxy.

If an entry with the mock IP address (or the second mock IP address) is not present in the policy data structure, the packet is dropped. As discussed above, the policy data structures are only populated with entries that include a given mock IP address after the DNS resolver (or another process in the control domain) identifies the mock IP address to provide to the DNS proxy after receiving a request to resolve the mock FQDN. Accordingly, the proxy may only apply the policy to received packets after the application (i.e., the application in step 700) has first issued a request to the DNS proxy to resolve the mock FQDN. Once the policy is obtained, the policy is applied to the packet in step 730.

In step 730, the policy is applied to the packet received in step 726. In one embodiment of the invention, the application of the policy to the packet may result in the packet being dropped. Specifically, the policy may specify various conditions that must be satisfied in order to continue processing of the packet received by the proxy. If the conditions are not satisfied, then the packet may be dropped and the process ends. However, if the packet is not dropped then at least a portion of the packet may be modified. The modification to the packet may be in the form of a modification to the header and/or a modification to the payload. The modification of the packet is based on the policy identified in step 730 and the processing performed by the proxy. For example, if the proxy is an HTTPS proxy, then the payload of the packet may be processed in accordance with the Transport Layer Security (TLS) protocol or the Secure Sockets Layer (SSL) protocol. In such scenarios, all or a portion of the payload in the packet received in step 726 may be compressed and/or encrypted. In one embodiment of the invention, the mock IP address (or second mock IP address) in the packet may also be updated to a second mock IP address (or a third mock IP address).

In step 732, the packet that results from step 730 is transmitted to the network adaptor.

In step 734, the network adaptor receives the packet from the proxy and then rewrites at least the mock IP address in the packet to an actual IP address (i.e., an IP address of the remote host server to which the application is attempting to connect). In one embodiment of the invention, the mock IP address that is present in the packet received in step 732 is used to identify the actual IP address. More specifically, the aforementioned mock IP address may be used to locate an entry in the policy data structure in the network adaptor. The identified policy may then include the actual IP address. As discussed above, if not entry is identified, then the packet may be dropped. In step 736, the packet resulting from step 734 is transmitted towards the remote host server.

While the FIGS. 7A and 7B cover the scenario in which the packet may be processed by a single proxy in the SVM, embodiments of the invention may be implemented in which the packet may be processed by multiple proxies in the SVM. In such scenarios, there may be multiple round trips of the packet between the network adaptor and the SVM, where there is a separate round trip for each proxy that is processing the packet. Alternatively, the packet may be sent from the network adaptor to the SVM and then be processed by all appropriate proxies in the SVM, where the packet that finally results from the processing by the proxies in then transmitted back to the network adaptor. In the above embodiments, the network adaptor and the various proxies in the SVM include the necessary entries in their policy data structures.

Figure 8:
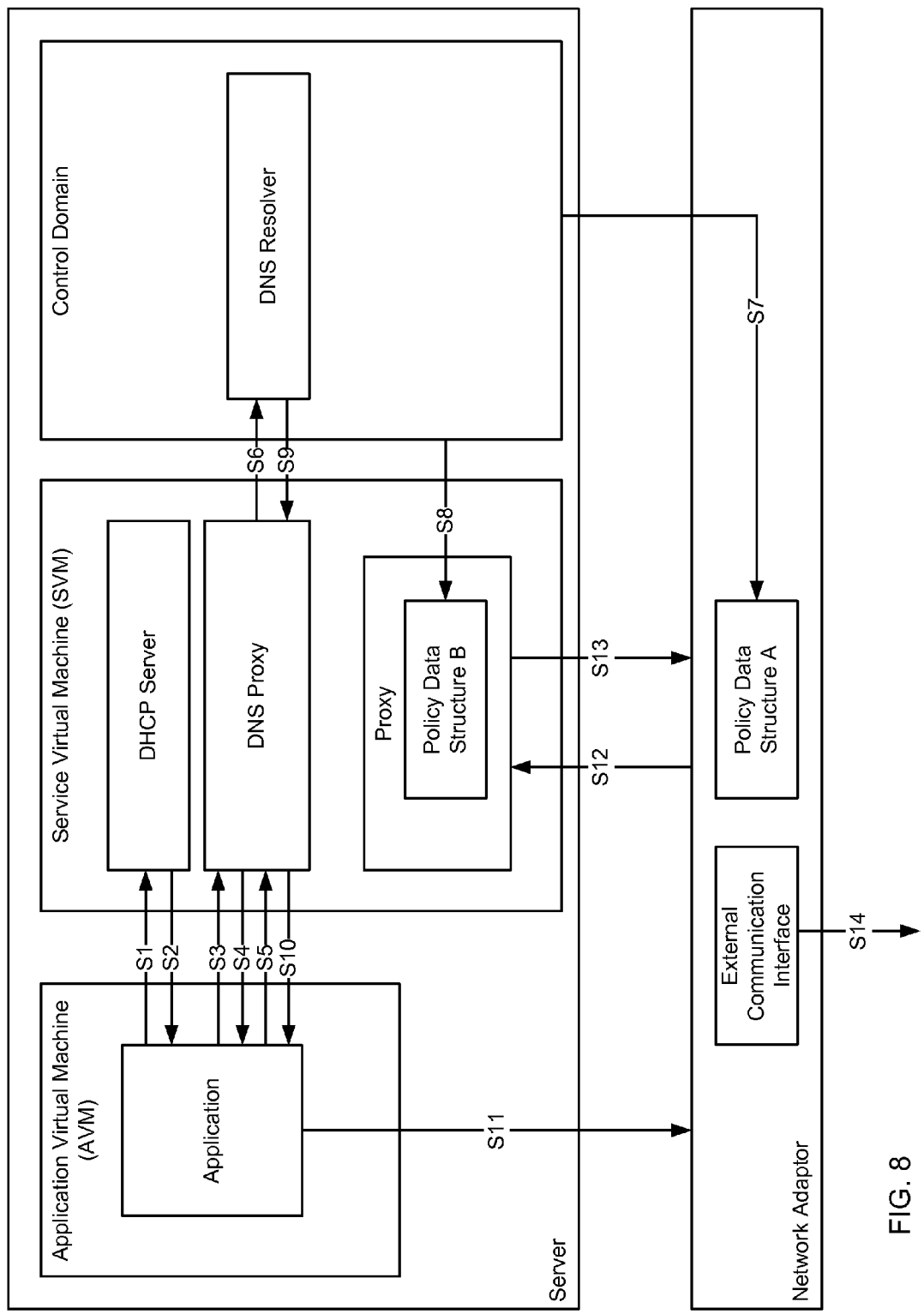
FIG. 8 shows an example in accordance with one or more embodiments of the invention.

FIG. 8 shows an example in accordance with one or more embodiments of the invention. The example is not intended to limit the scope of the invention. For purposes of this example, assume that the application is attempting to reach a remote host server and that the application has been configured to obtain the DNS resolver information from the DHCP server. Further, assume that the application has been provided with the following mock FQDN—computing_device_1.asp.com.

Turning to FIG. 8, at S1 the application sends a request to the DHCP server for the DNS resolver's IP address. In S2, the DHCP server returns 10.1.2.3, which the application considers to be the IP address of the DNS resolver. At S3, the application issues an ARP request using 10.1.2.3 in order to obtain to obtain the MAC address of the DNS resolver. At S4, the DNS proxy responds to the ARP request with its own MAC address (MAC address 1).

At S5, the application issues a request to resolve computing_device_1.asp.com to the DNS resolver using 10.1.2.3 as the destination IP address and MAC address 1 as the destination MAC address. The DNS proxy receives the request and, at S6, forwards the request to the DNS resolver in the control domain.

The receipt of the request by the DNS resolver triggers the following actions: (i) the DNS resolver (or another process in the control domain) determines that the remote host server to which the application is attempting to connect requires connections using HTTPS; (ii) based on (i), the DNS resolver (or another process in the control domain) generates a first entry that includes a first mock IP address (10.2.3.4) and a first policy that specifies that the first mock IP address is to be replaced with a second mock IP address (11.2.3.4) and that the updated packet second mock IP address is to be forwarded to the HTTPS proxy in the SVM; (iii) based on (i), the DNS resolver (or another process in the control domain) generates a second entry that includes the second mock IP address (11.2.3.4) and a second policy that specifies that the payload in the packet with the second mock IP address is to be modified to conform to HTTPS and that the resulting packet is to be forwarded to the network adaptor; and (iii) based on (i), the DNS resolver (or another process in the control domain) generates a third entry that includes the mock IP address (11.2.3.4) and a third policy that specifies that a packet with the second mock IP address is to be written to replace the second mock IP address with an actual IP address of the remote host server (38.114.214.18) and that the resulting packet is to be transmitted towards the remote host server.

At S7, the first and third entries are sent to the network adaptor for storage in policy data structure A and in S8 the second entry is sent to the proxy for storage in policy data structure B. At S9, the DNS resolver provides the mock IP address (10.2.3.4) to the DNS proxy. At S10, the DNS proxy provides the mock IP address (10.2.3.4) to the application.

In S11, the application attempts to initiate an HTTP connection to the remote host server using the mock IP address, 10.2.3.4. As part of this attempt, a packet with a destination IP address of 10.2.3.4 is sent to the network adaptor. Upon receipt of the packet, the network adaptor obtains the mock IP address (10.2.3.4) and attempts to locate an entry in policy data structure A with this mock IP address. The network adaptor ultimately identifies the first entry (as discussed above) and obtains the first policy that is present in the entry. The network adaptor subsequently applies the first policy to the packet. The result of the application of the first policy is an updated packet that includes a mock IP address of 11.2.3.4. Per the first policy, at S12, the updated packet is transmitted to the proxy.

Upon receipt of the updated packet, the proxy obtains the mock IP address (11.2.3.4) and attempts to locate an entry in policy data structure B with this mock IP address. The proxy ultimately identifies the second entry (as discussed above) and obtains the second policy that is present in the entry. The proxy subsequently applies the second policy to the updated packet. The result of the application of the second policy is a modified updated packet that includes a mock IP address of 11.2.3.4 and an updated payload that was generated in accordance with TLS. In this example, updated payload is generating using the original payload that was in the packet issued by the application (in S11) and the appropriate encryption keys that are present in the proxy. The use of the proxy to generate the modified updated packet is completely transparent to the application. Accordingly, the application does not have any information about or access to the encryption keys used to generate the updated payload.

Continuing with the example, per the second policy, at S13, the modified updated packet is transmitted to the network adaptor. Upon receipt of the modified updated packet, the network adaptor obtains the mock IP address (11.2.3.4) and attempts to locate an entry in policy data structure A with this mock IP address. The network adaptor ultimately identifies the third entry (as discussed above) and obtains the third policy that is present in the entry. The network adaptor subsequently applies the third policy to the modified updated packet. The result of the application of the third policy is a final packet that includes an actual IP address of the remote host server, 38.114.214.18. In this example, the final packet is generated by replacing the mock IP address in the modified updated packet with the actual IP address of the remote host server. Per the third policy, at S 14, the final packet is transmitted towards the remote host server.

Figure 9:
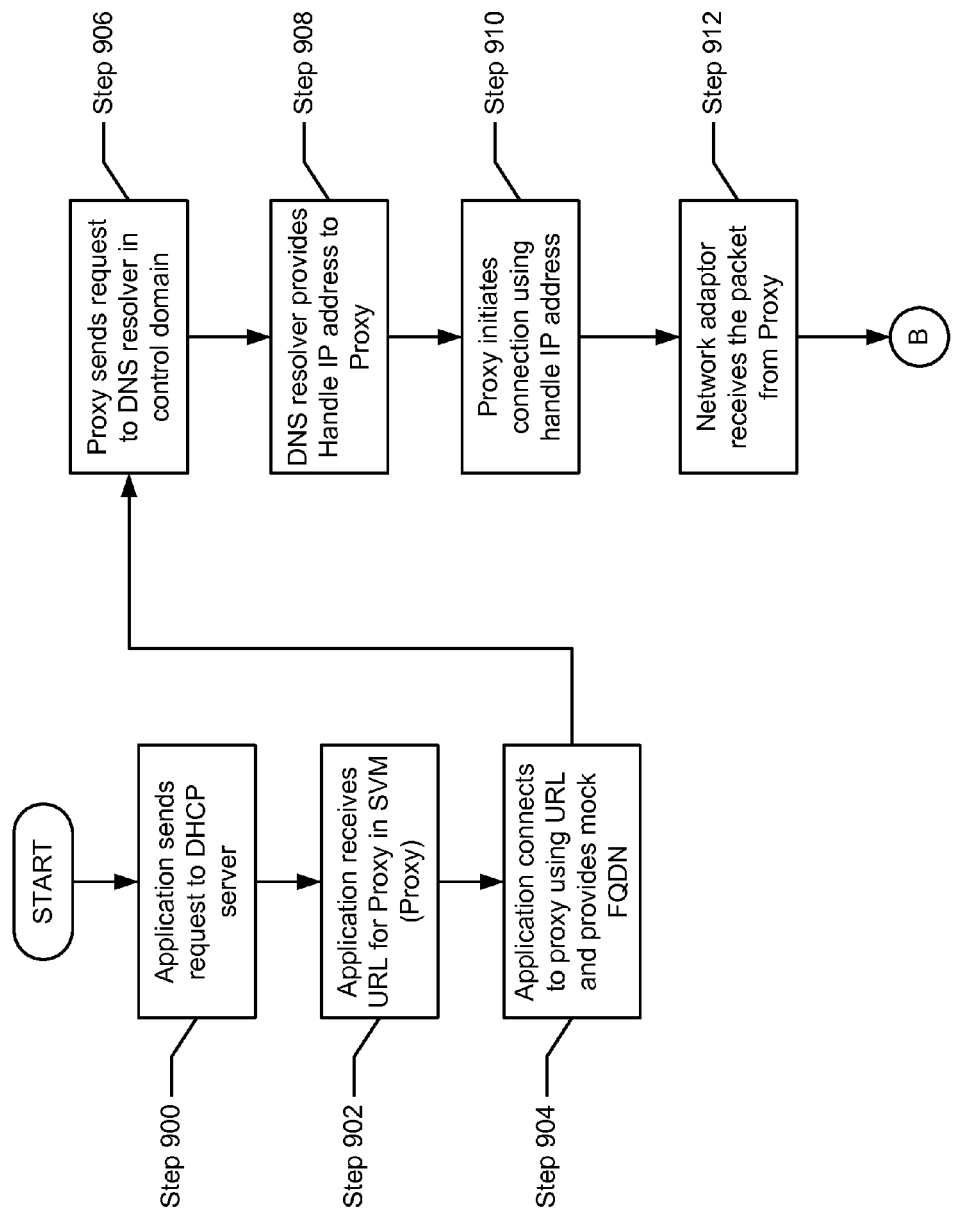
FIG. 9 shows a flowchart in accordance with one or more embodiments of the invention.

FIG. 9 shows a flowchart for connecting to a proxy in the SVM in accordance with one or more embodiments of the invention. More specifically, in the embodiment shown in FIG. 9, the application's connection to the proxy is performed in a non-transparent manner (i.e., the application is aware that it is communicating with the proxy).

While the various steps in the flowcharts are presented and described sequentially, one of ordinary skill will appreciate that some or all of these steps may be executed in different orders, may be combined or omitted, and some or all of the steps may be executed in parallel.

Turning to FIG. 9, in step 900, the application sends a request to a DHCP server (e.g., a DHCPINFORM query).

In step 902, in response to the request, the application receives a response from the DHCP server that includes a URL for the proxy in the SVM.

In step 904, application directly connects to the proxy using the URL received in step 902. Once connected, the application provides the mock FQDN to the proxy. The application provides the mock FQDN to the proxy along with a request for the proxy to connect to the remote host server corresponding to the mock FQDN.

In step 906, the proxy sends the request to the DNS resolver in the control domain.

In step 908, the DNS resolver processes the request to obtain a mock IP address. Step 908 may be performed in a manner that is the same or substantially similar to step 708 in FIG. 7A.

In step 910, the proxy initiates (or attempts to initiate) a connection to the remote host server using the mock IP address. As part of step 910 at least one packet that includes the mock IP address as the destination IP address is issued by the SVM to the network adaptor.

In step 912, the network adaptor receives the packet from the SVM. At this stage, the packet is processed in accordance with FIGS. 7A and 7B.

Figure 10:
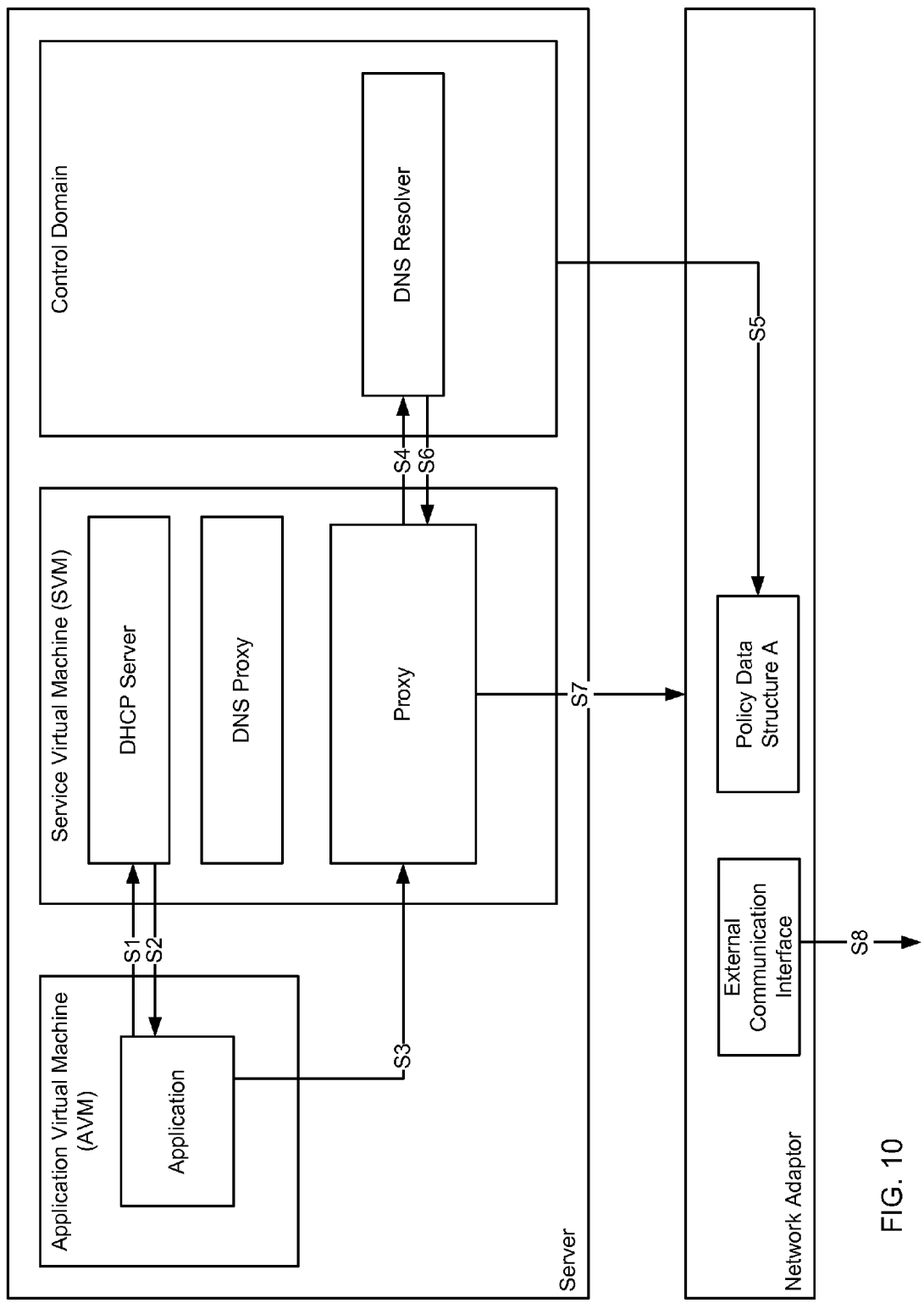
FIG. 10 shows an example in accordance with one or more embodiments of the invention.

FIG. 10 shows an example in accordance with one or more embodiments of the invention. The example is not intended to limit the scope of the invention. For purposes of this example, assume that the application is attempting to reach a remote host server and that the application has been configured to use WPAD to obtain the URL for the proxy from the DHCP server. Further, assume that the application has been provided with the following mock FQDN—computing_device_1.asp.com and that the proxy is an HTTPS proxy.

Turning to FIG. 10, in S1 the application issues a DHCPINFORM query to the DHCP server in the SVM. At S2, the DHCP server sends a response back to the application that includes the URL of a proxy in the SVM. At S3, the application connects to the proxy using HTTP and the URL obtained from the DHCP server. Once a connection has been established the application sends the proxy a request to connect to the remote host server using the mock FQDN. This request includes at least one packet from the application.

At S4, the proxy sends a request for the DNS resolver to resolve the mock FQDN.

The receipt of the request by the DNS resolver triggers the following action: the DNS resolver (or another process in the control domain) generates an entry that includes the mock IP address (10.2.3.4) and a policy that specifies that a packet with the mock IP address is to be rewritten to replace the mock IP address with an actual IP address of the remote host server (38.114.214.18) and that the resulting packet is to be transmitted towards the remote host server.

At S5, the entry is sent to the network adaptor for storage in policy data structure A. At S6, the DNS resolver sends the mock IP address (10.2.3.4) to the proxy.

At S7, the proxy attempts to initiate an HTTPS connection with the remote host server using the mock IP address (10.2.3.4). As part of this attempt, at least one packet is sent to the network adaptor from the proxy. The at least one packet includes a payload that conforms to the TLS standard (where the payload in the packet was generated based on the payload in the packet received by the application in S3).

Upon receipt of the packet from the proxy, the network adaptor obtains the mock IP address (10.2.3.4) and attempts to locate an entry in policy data structure A with this mock IP address. The network adaptor ultimately identifies the entry (as discussed above) and obtains the policy that is present in the entry. The network adaptor subsequently applies the policy to the packet. The result of the application of the policy is a final packet that includes an actual IP address of the remote host server, 38.114.214.18. In this example, the final packet is generated by replacing the mock IP address in the packet with the actual IP address of the remote host server. Per the policy, at S18, the final packet is transmitted towards the remote host server.

Embodiments of the invention may be implemented using mock IP address and non-mock IP addresses (also referred to as IP addresses or actual IP addresses) that conform to either IPv4 or IPv6.

Figure 11:
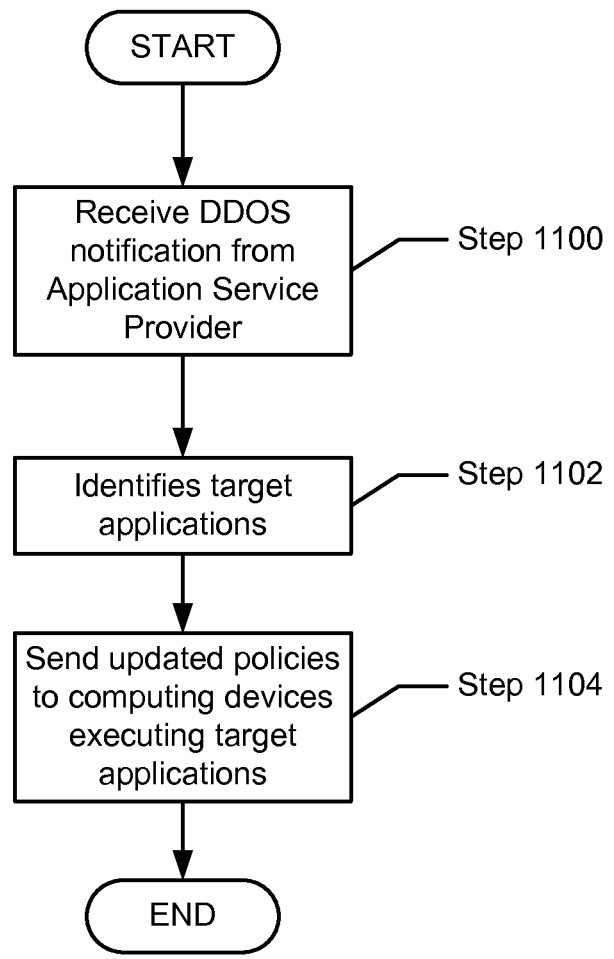
FIGS. 11-12 show a method for responding to a distributed denial of service (DDOS) attack in accordance with one or more embodiments of the invention.
Figure 12:
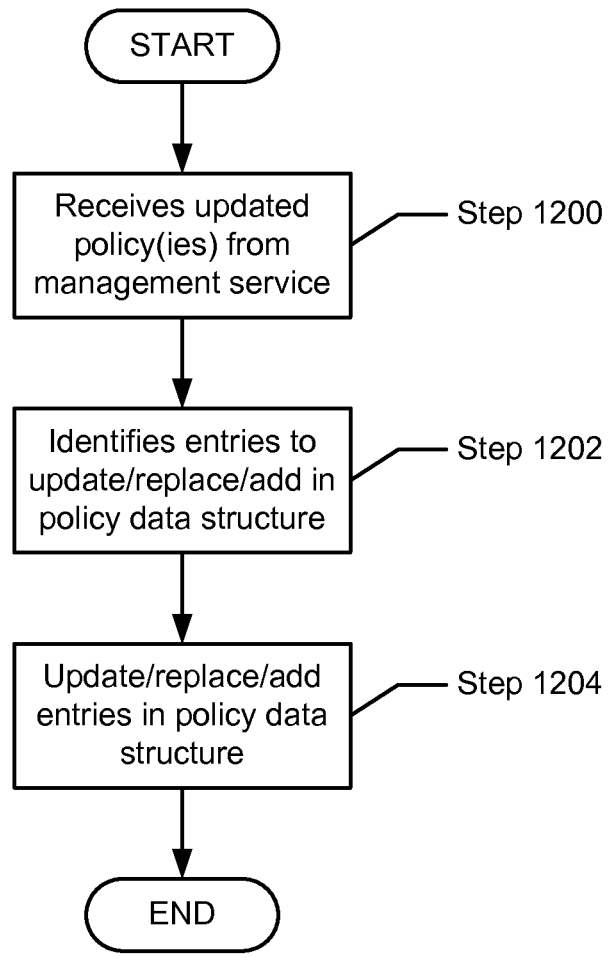

FIGS. 11-12 show a method for responding to a distributed denial of service (DDOS) attack in accordance with one or more embodiments of the invention. More specifically, FIG. 11 describes the communication between an application service provider and the management service.

Turning to FIG. 11, in step 1100, a DDOS notification (also referred to as notification) is received from an application service provider. In one embodiment of the invention, the notification is generated and sent when application service provider determines (e.g., using its own functionality and/or information from an anti-DDOS service) that it is undergoing a DDOS attack. The application service provider may use any known or later discovered method for determining whether it is under a DDOS (or DOS) attack. The notification may indicate that the application service provider has detected a DDOS attack (or a potential DDOS attack). Further, the notification may include zero or more IP addresses. The notification may be communicated to the management service via an application programming interface (API) that is exposed/published by the management service. Other methods of providing the notification to the management service may be used without departing from the invention.

In one embodiment of the invention, the notification includes an IP address that all applications (e.g., applications that are executing on the computing devices) should now use for communicating with the application service provider. The IP address that is included in the notification is different than the IP address that the computing device is currently using to communicate with the application service provider.

In another embodiment of the invention, the notification includes multiple IP addresses, where each of the multiple IP addresses is different than the IP address (or multiple IP addresses) that is currently being used to communicate with the application service provider.

In another embodiment of the invention, the notification may also include additional information about how specific computing devices and/or specific applications should communicate with the application service provider. For example, the notification may indicate that computing device X should now communicate with the application service provider using HTTPS. In another example, the notification may indicate that application X (which is executing on a computing device) should communicate with the application service provider using HTTPS. In another example, the notification may indicate that certain applications should be prevented (or limited) from sending packets to the ASP.

In such scenarios, the notification may specify computing devices and/or applications at any level of granularity. For example, the notification may specify all computing devices within a given enterprise, all computing devices within specific geographic location, all computing devices that have a specific CoS, etc.

Continuing with the discussion of FIG. 11, in step 1102, the management service, after receiving the notification from the application service provider, identifies one or more target applications on the computing devices that it manages.

More specifically, the management service identifies all applications that are communicating with (or that are allowed to communicate with) the application service provider. In one embodiment of the invention, the management service includes information about all applications executing on each of the computing devices. This information may be used to identify the applications that are communicating with (or that can communicate with) the application service provider.

In step 1104, the management service generates and sends an updated policy to each computing device that includes a target application identified in step 1102.

In one embodiment of the invention, generating the updated policy for each application may include: (i) determining an IP address that the application should use to communicate with the application service provider; (ii) determining whether the application service provider has requested a modification with respect to how the application communicates with the application service provider (e.g., the application service provider requires that the application use a non-Internet channel, e.g., MPLS, to communicate with the application service provider, the application should be prevented from sending packets to the ASP, the application limited in the number of packets that it can send to the ASP); and (iii) generating an updated policy based upon the results of (i) and (ii).

In one embodiment of the invention, step (i) may include using the single IP address provided in the notification from the application service provider, may include selecting an IP address from the set of IP addresses that was provided in the notification from the application service provider, or may include selecting an IP address from the set of IP addresses that were previously provided to the management service by the application service provider (i.e., IP addresses that were provided to the management service prior to the receipt of the notification by the application service provider).

In one embodiment of the invention, the management service uses a load balancing algorithm to select an IP address from the set of IP addresses. More specifically, the management service may attempt to distribute all traffic from the computing devices that it manages across the set of IP addresses provided by the application service provider. In another embodiment of the invention, the IP address may be randomly selected from the set of IP addresses. Other methods for selecting an IP address from the set of IP addressed maybe used without departing from the invention.

In one embodiment of the invention, if a single computing device includes multiple applications that are communicating with the application service provider, then the management service may generate a single updated policy for all applications executing on the computing device or, alternatively, the management service may generate a distinct updated policy for each application or subset of applications executing on the computing device.

Regardless of whether a single updated policy or multiple updated policies are generated for applications executing on a single computing device, the management service, based on information provided by the application service provider, considers each application individually and determines how that application should interact with the application service provider. For example, the management service may determine that a first application executing on the computing device should now communicate with the application service provider using a first IP address via an Internet channel and that a second application executing on the computing device should communicate with the application service provider using a second IP address and a non-Internet channel.

In one embodiment of the invention, the updated policy may only be applicable for a specific period of time. For example, the updated policy may specify that a first IP address is to be used for the next three hours. In such scenarios the management service may send a second updated policy with a new IP address and new time duration. The use of updated policies that are only valid for a specific period of time allows the application service provider to periodically change the IP address that are used to access the application service provider. This may further hamper the ability of malicious third parties to launch DOS or DDOS attacks against the application service provider.

In one embodiment of the invention, the updated policy may specify a first IP address for a first duration and a second IP address to use for a second duration. For example, IP address 1 may be used from noon-3 pm and IP address 2 may be used from 3:01 pm-6 pm.

In one embodiment of the invention, the update policy may also include the mock FQDN that the application is using to access the service of the application service provider (ASP) executing on a remote host server. The mock FQDN in the updated policy may be used to implement the policy in the computing device.

At this stage, the update policies have been sent to the appropriate computing devices. FIG. 12 shows a method for applying the updated policies on the computing devices in accordance with one or more embodiments of the invention.

Turning to FIG. 12, in Step 1200, the computing device receives one or more updated policies from the management service.

Figure 13:
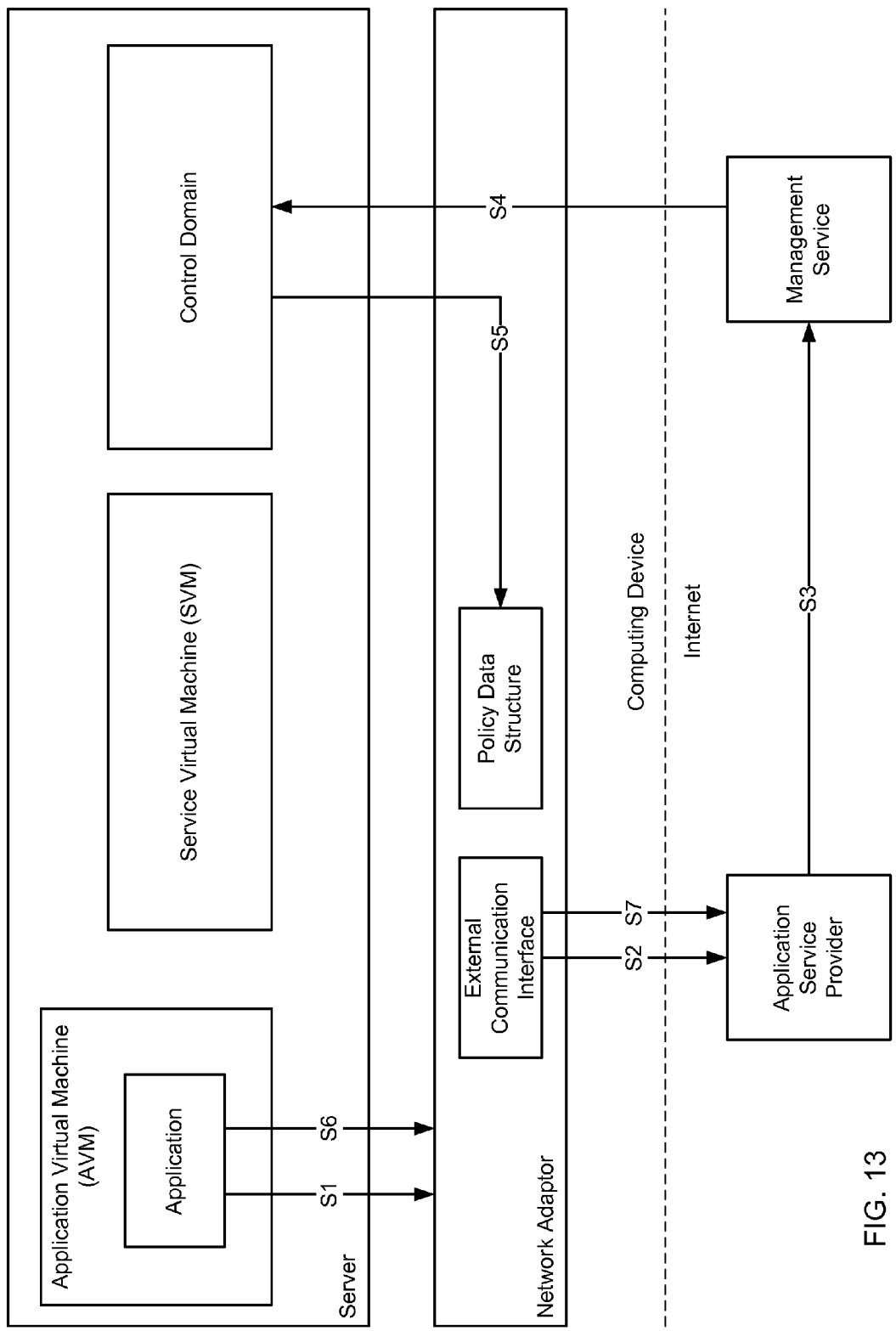
FIGS. 13-15 show examples in accordance with one or more embodiments of the invention.
Figure 14:
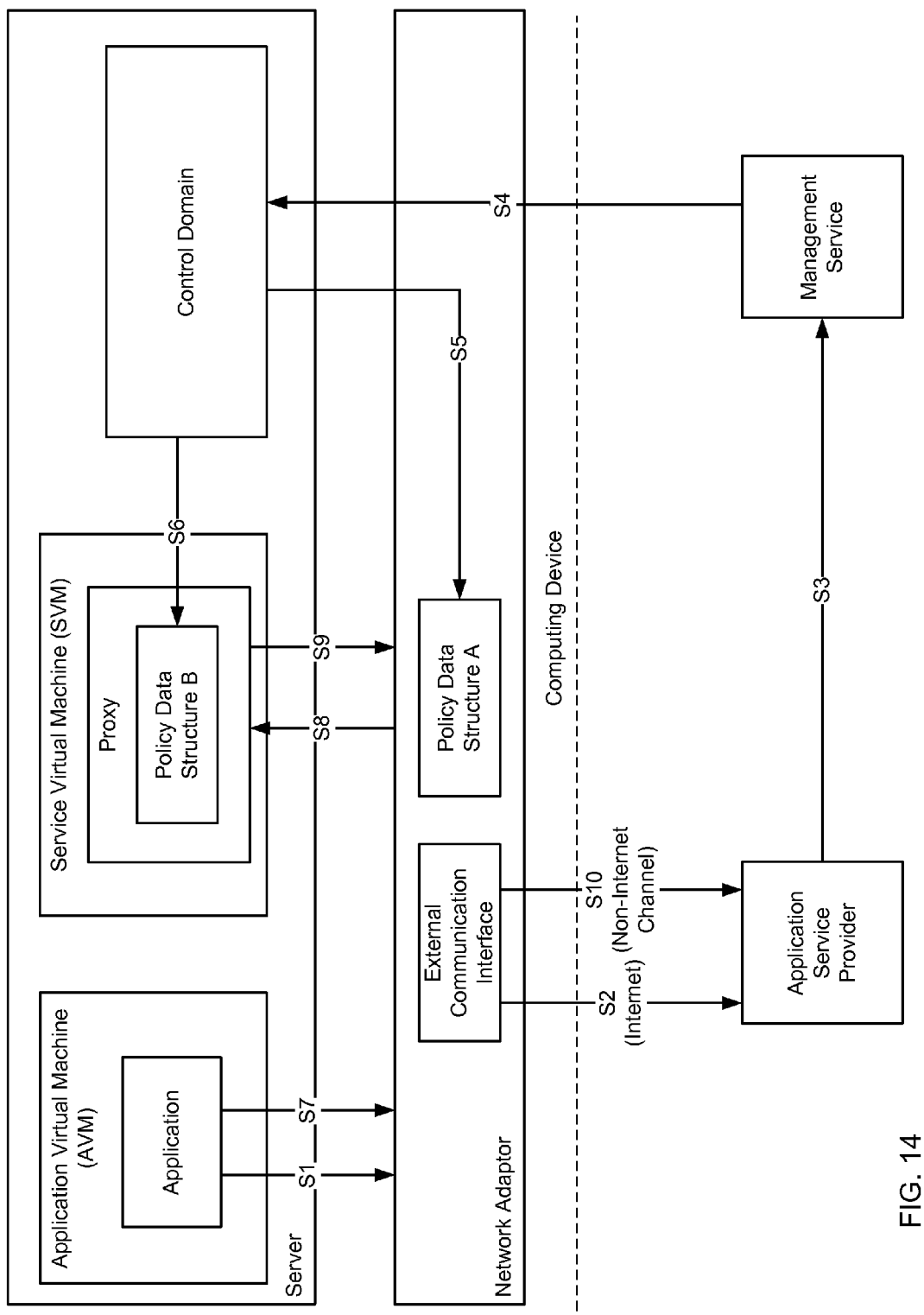

In step 1202, the computing device processes the updated policies received in step 1200 and determines which entries, if any, in the policy data structures (see e.g., FIG. 13, policy data structure; FIG. 14, policy data structure A, policy data structure B) need to be added, updated, or replaced.

The determination of whether to add, update, or replace an entry in one or more policy data structures is based upon the information received in the updated policy(ies) received from the management service.

For example, if the updated policy only change is the IP address that is to be used to communicate with the application service provider then a single entry in the policy data structure in the network adapter may need to be updated (see e.g., FIG. 13).

In another example, if the updated policy requires that the subsequent communication between the application and the application service provider uses a secure Internet channel e.g., HTTPS, then at least one entry may need to be updated in the policy data structure located in the network adapter and at least one additional entry may need to be added to the policy data structure in the HTTPS proxy in the SVM (see e.g. FIG. 14). The invention is not limited to the aforementioned examples.

Continuing with the discussion of FIG. 12, in step 1204, the appropriate entries in the various policy data structures are updated, replaced and/or added based on the determination made in step 1202. At this stage, the application executing in the AVM may communicate with the application service provider in accordance with the updated policy received by the computing device.

Figure 15:
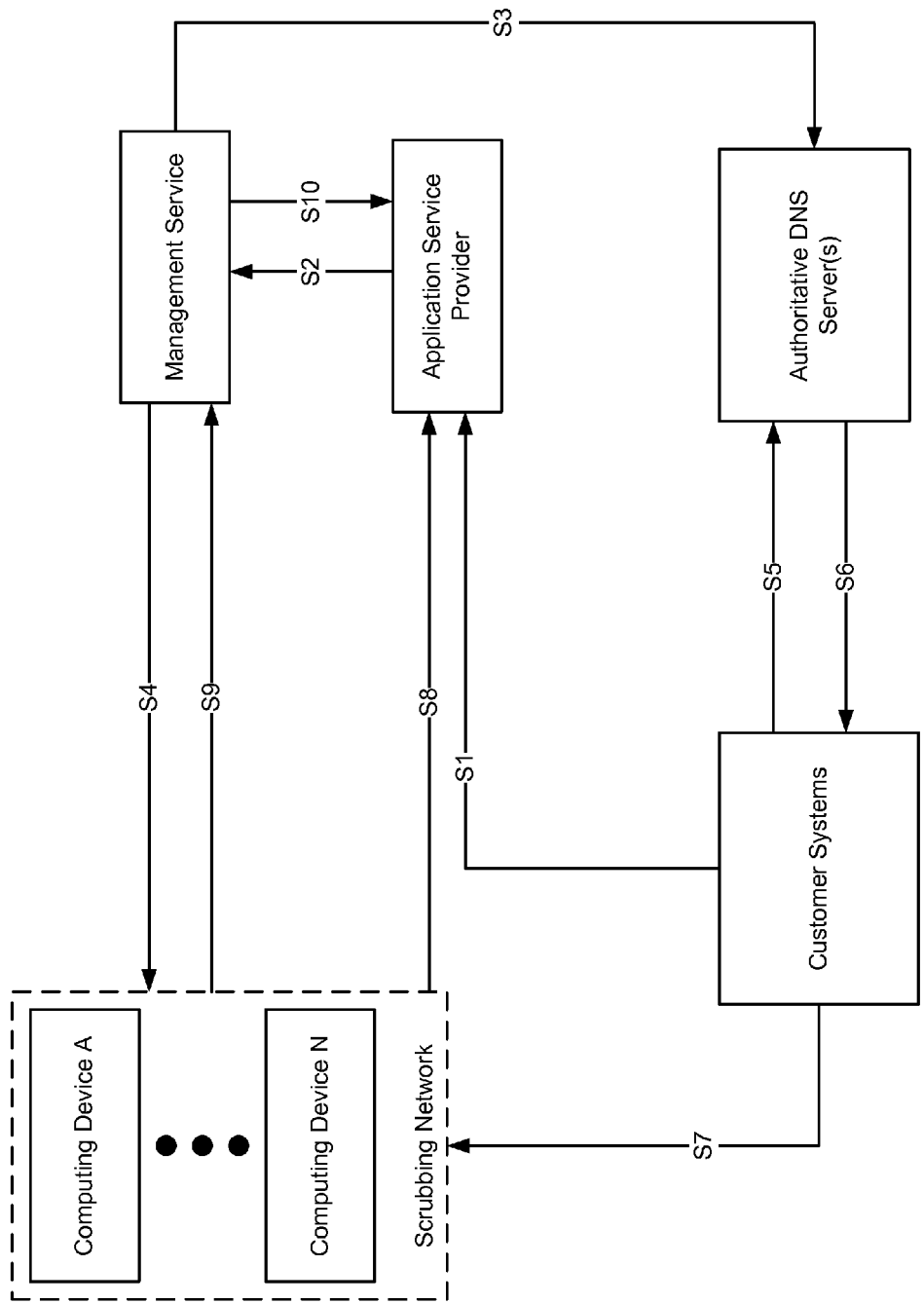
Figure 16:
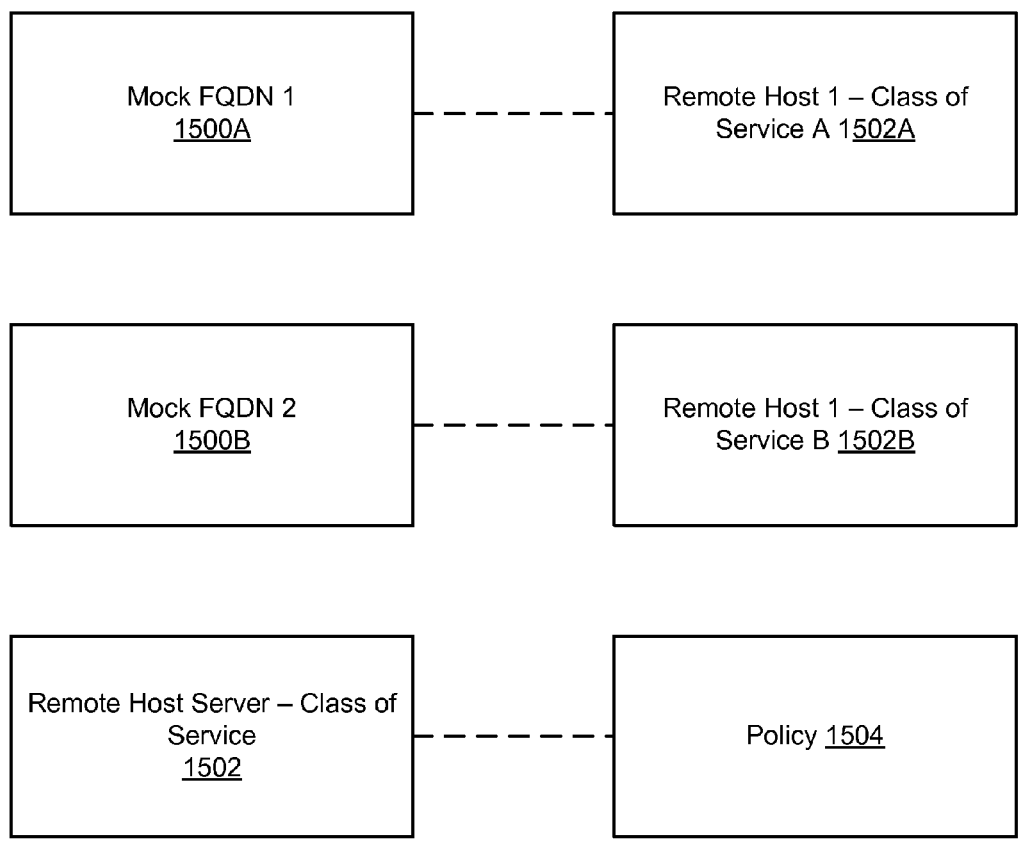
FIG. 16 shows relationships between various components in the system in accordance with one or more embodiments of the invention.

FIGS. 13-15 show examples in accordance with one or more embodiments of the invention. The examples are not intended to limit the invention.

Turning to FIG. 13, for purposes of this example assume that the application has already performed the steps shown in FIGS. 6-7B and that the application is already communicating with the application service provider (or, more specifically, a remote host server through which the application service provider is providing its service).

At S1, the application sends a packet (that includes the mock IP address as the destination IP address) towards the application service provider. The network adapter subsequently receives the packet and performs a look-up in the policy data structure using the mock IP address in order to identify an entry, where the entry includes the mock IP address and an IP address that may be used to communicate with the application service provider.

The network adapter subsequently rewrites at least the destination IP address in the IP header of the packet received from the application with the IP address obtained from the aforementioned entry. In S2, the updated packet is then sent towards the application service provider.

At some later point in time, the application service provider determines that it is the subject of a DDOS attack. At S3, the application service provider sends a notification to the management service where the notification includes a second IP address. The management service subsequently receives the notification and determines, based on information maintained by the management service, that the computing device includes an application that is communicating with the application service provider. At S4, based on this determination, an updated policy is sent to the control domain within the computing device. The updated policy includes the second IP address and specifies that the application is to use the second IP address to communicate with the application service provider.

At S5, the control domain updates the entry in the policy data structure (i.e., the entry that includes a mock IP address and the IP address) to replace the IP address with the second IP address. The control domain may identify the appropriate entry to update by obtaining the mock FQDN from the updated policy and then determining the mock IP address that is associated with this mock FQDN. The mock IP address may then be used to identify the appropriate entry in the policy data structure.

At some later point in time, the application sends (S6) a second packet towards the application service provider where the second packet includes the mock IP address as the destination IP address in the IP header. The network adapter subsequently receives the second packet and obtains an entry from the policy data structure using the mock IP address, where the entry includes the mock IP address and the second IP address. The network adapter subsequently rewrites at least the destination IP address in the IP header of the second packet to be the second IP address. The rewritten second packet, at S7, is subsequently sent to the application service provider.

As shown in the above example, the application is unaware that a new IP address is being used to communicate with the service provider. Said another way, the application continues to use the mock IP address as the destination IP address in packet sent towards the application service provider while a second IP address is actually being used to connect to the application service provider. By using a second IP address to connect to the application service provider the application service provider may treat network traffic received at the second IP address as network traffic that should be processed by the application service provider instead of network traffic that may be the result of the DDOS attack. In this manner the application service provider may continue to provide service to the application at the specified CoS while the application service provider is the subject of a DDOS attack.

Turning to FIG. 14, for purposes of this example assume that the application has already performed the steps shown in FIGS. 6-7B and that the application is already communicating with the application service provider (or, more specifically, a remote host server through which the application service provider is providing its service).

At S1, the application sends a packet that includes a mock IP address as the destination IP address towards the application service provider (or, more specifically, a remote host server through which the application service provider is providing its service). The network adapter subsequently receives this packet. The network uses the mock IP address in the received packet to perform a look-up in policy data structure A in order to find an entry that includes the mock IP address. The network adapter locates the entry and then applies the policy specified in the entry. In this example the policy specifies that the mock IP address is to be replaced with a first IP address and that the resulting rewritten packet is to be sent towards the application service provider. The network adapter subsequently applies the policy and then, at S2, sends the rewritten packet towards the application service provider.

At some later point in time the application service provider determines that it is under a DDOS attack and, at S3, sends a notification to the management service. In this example the notification includes a second IP address and specifies that subsequent communication between the application and the application service provider should be performed using a non-Internet channel. In addition, the application service provider (via the notification) provides the management service with the required information for establishing a non-Internet channel between the application and the application service provider.

The management service subsequently receives the notification and the required information for setting up a non-Internet channel. The management service subsequently identifies the computing device upon which the application communicating with the application service provider is executing.

The management service also generates an updated policy in accordance with the notification and other information obtained from the application service provider. The management service, at S4, then sends the updated policy to the computing device it previously identified.

The control domain within the computing device subsequently receives the updated policy and generates three entries. The first entry includes the mock IP address (i.e., but mock IP address that the application used in S1 to send the packet towards the application service provider) and a second mock IP address and specifies that a packet with the mock IP address is to be rewritten to replace the mock IP address with the second mock IP address and that the rewritten packet is to be transmitted to the proxy in the SVM.

The second entry includes the second mock IP address and specifies that the packet received from the network adapter is to be processed by the proxy such that it may be sent to the application service provider using the non-Internet channel.

The third entry includes the second mock IP address and specifies that packets with the second mock IP address are to be written to replace the second mock IP address with a second IP address and that the rewritten packet is to be transmitted towards the application service provider.

At S5, the first and third entries are sent to the network adapter for storage in policy data structure A. During the storage of the first and third entries the original entry that included the mock IP address is removed from policy data structure A. At S6, the second entry is sent to the proxy for storage in policy data structure B.

Following S6, the application generates a second packet to send to the application service provider where the second packet includes the mock IP address. The network adapter subsequently receives the second packet and performs a lookup in policy data structure A to obtain the first entry. Network adapter subsequently applies the policy in the first entry which results in the second packet being rewritten to include the second mock IP address as the destination IP address. The rewritten second packet, at S8, is transmitted to the proxy. The proxy subsequently receives the rewritten second packet and obtains the second entry using the second mock IP address. The proxy been applies the policy in the second entry which results in the modification of at least one of the header of the rewritten second packet and the payload of the rewritten second packet in order to generate a third packet.

At S9, the third packet is transmitted back to the network adapter. The network adapter subsequently performs a lookup in policy data structure A to identify the third entry using the second mock IP address. The network adapter then applies the policy in the third entry to obtain a fourth packet where the fourth packet includes the second IP address as the destination IP address of the packet. At S10, the fourth packet is transmitted, via a non-Internet channel, to the application service provider.

While the prior examples have been directed towards modifying how applications executing on computing devices may interact with an application service provider, the example shown in FIG. 15 describes a scenario in which the computing devices are used as part of a scrubbing network for all (or at least a portion of the) network traffic that is destined for the application service provider. More specifically, when an application service provider determines it is under attack, the application service provider may communicate with the management service in order to direct traffic that is currently originating from the customer systems to the scrubbing network. This allows the scrubbing network to determine which packets to ultimately transmit to the application service provider and, in the addition, may provide (via the management service) information/statistics regarding the nature of the attack.

Turning to FIG. 15, consider a scenario in which one or more customer systems is sending packets to the application service provider (S1). At some point in time the application service provider determines that it is under a DDOS attack. At S2, the application service provider sends a notification to the management service to redirect network traffic that is destined to the application service provider to the scrubbing network.

At S3, the management service updates the appropriate authoritative DNS servers to redirect traffic from the customer systems to the scrubbing network. At S4, the management service updates the computing devices in the scrubbing network such that they are ready to process network traffic received from the customer systems. S4 may include instantiating one or more applications in the AVMs of the computing devices. Further S4 may include adding/removing/updating one or more entries in the appropriate policy data structures in the computing device.

At S5, a customer system subsequently sends a request to resolve the FQDN of the application service provider. At S6, the DNS server provides an IP address of a computing device in the scrubbing network. The customer system subsequently issues packets, which they believe are being sent to the application service provider, to a computing device on the scrubbing network.

The computing devices in the scrubbing network subsequently process network traffic from the customer systems. Based on the processing some packets may be dropped while other packets may be sent to the application service provider (S8).

At S9, the computing devices in the scrubbing network may transmit information to the management service. This information may include statistics and other information about the type of network traffic that is being processed by the scrubbing network.

At S10, the management service may provide the information received in S9 (or information derived from the information received in S9) to the application service provider. This information may be used by the application service provider to better understand the nature of the attack on the application service provider.

Embodiments of the invention may also be used to provide different classes of service between different applications executing on the computing device and a remote host server. For example, the applications on the computing device may be configured to communicate with one or more processes (or applications) executing on the remote host server where a first application communicates with the remote host server in accordance with a first CoS and a second application communicates with the remote host server with a second CoS.

In one embodiment of the invention, the CoS that is applied to each application is done in a manner that is transparent to the application. In one embodiment of the invention, the management service uses the mock FQDNs to specify the CoS that applies to each application. For example, with reference to FIG. 16, a first application may be provided with mock FQDN 1 (1500A) and a second application may be provided with mock FQDN 2 (1500B). Each of these mock FQDNs may be associated with a different class of service (e.g., 1502A, 1502B). Further, each class of service is ultimately implemented on the computing device using a corresponding policy (1504). Accordingly, network traffic from applications that are to be processed using a first class of service are provided with mock FQDN 1 and the network traffic from applications that are to be processed using a second class of service are provided with mock FQDN 2. When the aforementioned mock FQDN's are resolved (see e.g., FIG. 6-7B), the corresponding policies are implemented in order to achieve the specified class of service.

Figure 17:
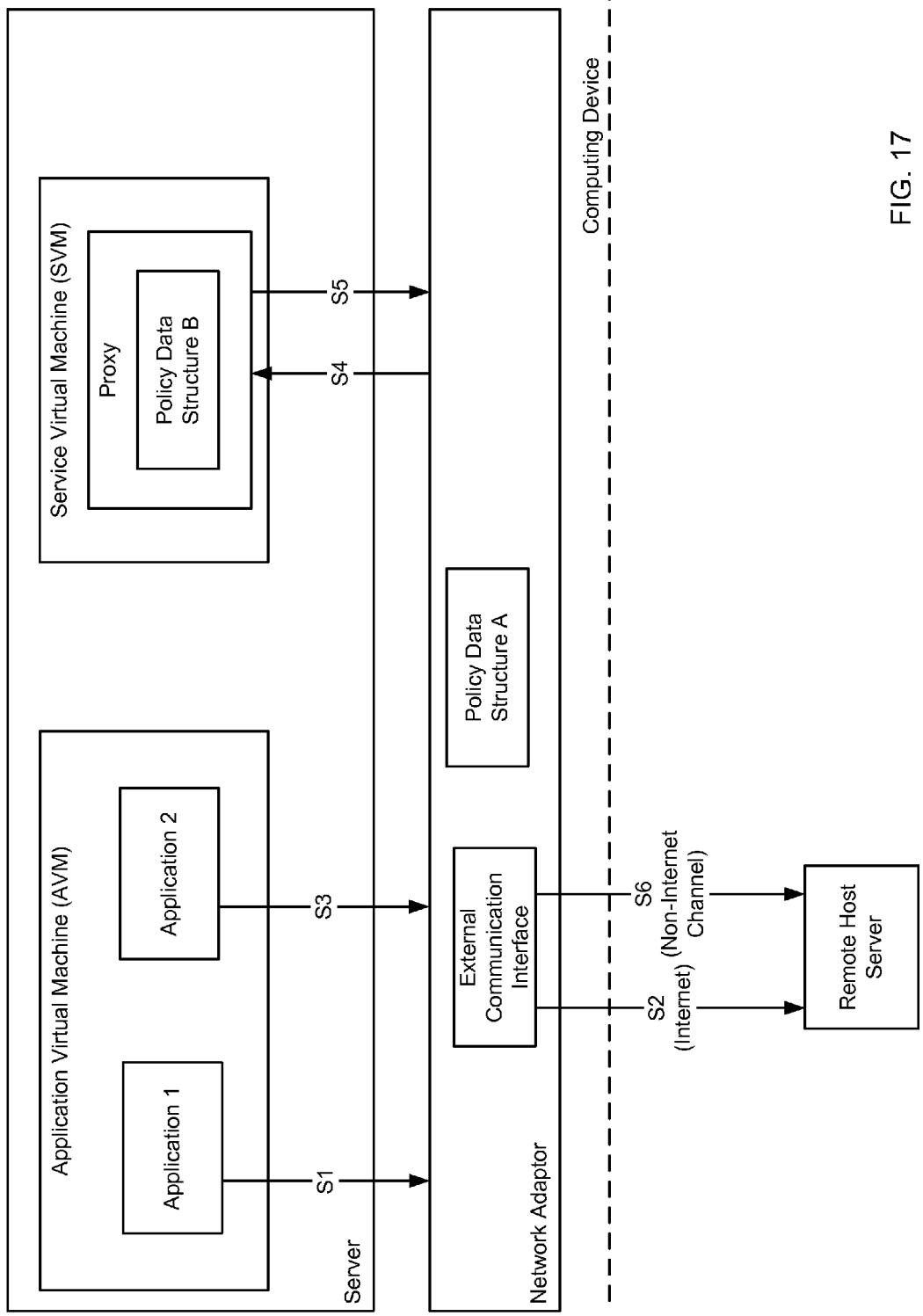
FIG. 17 shows an example in accordance with one or more embodiments of the invention.

FIG. 17 shows an example in accordance with one or more embodiments of the invention. This example is not intended to limit the scope of the invention. Turning to FIG. 17, consider a scenario in which the computing device includes two applications (Application 1, Application 2) where the applications are both communicating with the same remote host server.

However, each of the applications communicates with the remote host server using a different class of service. Specifically, in this example, Application 1 is transmitting non-sensitive data to the remote host server and, as such, is able to communicate with the remote host server using the Internet (i.e., a potentially non-secure channel). Application 2, in contrast, is transmitting sensitive information to the remote host server and, as such, must communicate this information to the remote host server using a secure non-Internet-based communication channel.

Based on these requirements, the management service (not shown) may send a first mock FQDN to Application 1 and a second mock FQDN to Application 2. When Application 1 attempts to send packets to the remote host server, the first mock FQDN is resolved (in accordance with FIGS. 6-7B) to mock IP address 10.2.3.4 and a first entry is generated and stored in policy data structure A that includes the mock IP address and a first IP address (38.114.214.18).

When Application 2 attempts to send packets to the remote host server, the second mock FQDN is resolved (in accordance with FIGS. 6-7B) to mock IP address 11.2.3.4. Further, a second entry is generated and stored in policy data structure A that includes the second mock IP address (i.e., 11.2.3.4) and a third mock IP address (12.2.3.4) and a third entry is generated and stored in policy data structure A that includes the third mock IP address and a second IP address (48.114.214.18). In addition, a fourth entry is generated and stored in policy data structure B that includes the second mock IP address (i.e., 12.2.3.4) and instructions to modify the packet received from the network adaptor to conform to MPLS.

Once the above configuration has been performed, then packets from the applications may take different paths to reach the same remote host server. For example, packets issued from Application 1 are transmitted directly to the network adaptor (S1). The network adaptor then uses the mock IP address in the first packet to locate the first entry. The packet is subsequently rewritten, in accordance with the first entry, to include IP address 38.114.214.18 as the destination IP address. The rewritten packet is subsequently sent to the remote host server via the Internet (S2).

With respect to Application 2, packets are transmitted to the network adaptor using the second mock IP address (S3). The network adaptor then uses the second mock IP address in the packet to locate the second entry. The packet is subsequently rewritten, in accordance with the second entry, to include a third mock IP address as the destination IP address. The rewritten packet is subsequently sent to the proxy in the SVM (S4). The proxy obtains the third entry from policy data structure B using the third mock IP address. The packet is subsequently modified in order that it may be transmitted to the remote host server using MPLS. At S5, the updated packet is transmitted to the network adaptor.

The network adaptor then uses the third mock IP address in the updated packet to locate the fourth entry. The packet is subsequently rewritten, in accordance with the fourth entry, to include IP address 48.114.214.18 as the destination IP address. The rewritten packet is subsequently sent to the remote host server via a non-Internet channel (S6).

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for managing network access, comprising:
    issuing, by an application executing an application virtual machine (AVM), a request for a domain name service (DNS) resolver to resolve a mock fully qualified domain name (FQDN), wherein the mock FQDN is associated with an application service provider (ASP), and wherein the mock FQDN is associated with a Class of Service (CoS);
    processing, by a DNS proxy executing in a service virtual machine (SVM), the request in order to obtain a mock Internet Protocol (IP) address;
    providing, by the DNS proxy, the mock IP address to the application;
    transmitting, by the application, a first packet comprising the mock IP address;
    receiving, by a network adaptor, the first packet;
    obtaining, by the network adaptor, a first policy associated with the mock IP address; and
    replacing, by the network adaptor, the mock IP address in the first packet with a first IP address to obtain a second packet, wherein the first IP address is associated with a remote server host and is specified in the first policy;
    transmitting the second packet towards the remote server host, wherein the remote server host is associated with the ASP,
    after transmitting the second packet:
        receiving, by the computing device, an updated policy from a management service, wherein the updated policy specifies that the application should use a second IP address to communicate with the ASP over an Internet Channel, wherein the updated policy specifies that a second application on the computing device should communicate with the ASP using a non-Internet Channel, wherein the non-Internet Channel comprises using Multiprotocol Label Switching (MPLS) to communicate between the application and the ASP, wherein the management service issues the updated policy in response to the detection of a Distributed Denial of Service (DDoS) attack;
        updating, based on the updated policy, the first policy to obtain a second policy, wherein the second policy comprises the second IP address and is associated with the mock IP address;
        transmitting, by the application, a third packet comprising the mock IP address;
        receiving, by the network adaptor, the third packet;
        obtaining, by the network adaptor, the second policy associated with the mock IP address; and
        replacing, by the network adaptor, the mock IP address in the third packet with the second IP address to obtain a fourth packet, wherein the second IP address is associated with the remote server host;
        transmitting the fourth packet towards the remote server host,
    wherein the AVM and the SVM execute on a computing device,
    wherein the computing device comprises the network adaptor.

2. The method of claim 1,
    wherein the updated policy comprises a plurality of IP addresses,
    wherein the computing device selects the second IP address from the plurality of IP addresses.

3. The method of claim 1,
    wherein the updated policy specifies that the application should use the second IP address to communicate with the ASP;
    wherein the updated policy specifies that a third application on the computing device should use a third IP address to communicate with the ASP.

4. The method of claim 1,
    wherein the updated policy specifies that the application should use the second IP address to communicate with the ASP for a first period of time;
    wherein the updated policy specifies that the application should use a third IP address to communicate with the ASP for a second period of time, wherein the second period of time follows the first period of time.

5. The method of claim 1, wherein obtaining the first policy comprises:
    performing a look-up in a policy data structure using the mock IP address, wherein the policy data structure is located in the network adaptor.

6. The method of claim 1, wherein processing the request in order to obtain the mock IP address comprises:
    providing, by the DNS proxy, the mock FQDN to the DNS resolver in the control domain on the computing device;
    determining, by the DNS resolver, the mock IP address; and
    providing, by the DNS resolver, the mock IP address to the DNS proxy.

7. The method of claim 6,
wherein a policy data structure is only populated with an entry comprising the mock IP address after the DNS resolver determines the mock IP address,
wherein obtaining the first policy comprises performing a look-up in the policy data structure using the mock IP address, wherein the policy data structure is located in the network adaptor.

8. A method for managing network access, comprising:
issuing, by an application executing in an application virtual machine (AVM), a request for a domain name service (DNS) resolver to resolve a mock fully qualified domain name (FQDN), wherein the mock FQDN is associated with an application service provider (ASP), and wherein the mock FQDN is associated with a Class of Service (CoS);
processing, by a DNS proxy executing in a service virtual machine (SVM), the request in order to obtain a mock Internet Protocol (IP) address;
providing, by the DNS proxy, the mock IP address to the application;
transmitting, by the application, a first packet comprising the mock IP address;
receiving, by a network adaptor, the first packet;
obtaining, by the network adaptor, a first policy associated with the mock IP address; and
replacing, by the network adaptor, the mock IP address in the first packet with a first IP address to obtain a second packet, wherein the first IP address is associated with a remote server host and is specified in the first policy;
transmitting the second packet towards the remote server host, wherein the remote server host is associated with the ASP,
after transmitting the second packet:
  receiving, by the computing device, an updated policy from a management service, wherein the updated policy specifies that the application should use a second IP address to communicate with the ASP over an Internet Channel, wherein the updated policy specifies that a second application on the computing device should communicate with the ASP using a non-Internet Channel, wherein the non-Internet Channel comprises using Multiprotocol Label Switching (MPLS) to communicate between the application and the ASP, wherein the management service issues the updated policy in response to the detection of a Distributed Denial of Service (DDoS) attack;
  updating, based on the updated policy, the first policy to obtain a second policy, wherein the second policy comprises a second mock IP address and is associated with the mock IP address;
  transmitting, by the application, a third packet comprising the mock IP address;
  receiving, by the network adaptor, the third packet;
  obtaining, by the network adaptor, the second policy associated with the mock IP address; and
  replacing, by the network adaptor, the mock IP address in the third packet with the second mock IP address to obtain a fourth packet;
  transmitting the fourth packet towards a proxy in the SVM
  obtaining, by the proxy, a third policy associated with the second mock IP address;
  processing, by the proxy, the fourth packet based on the third policy to obtain a fifth packet;
  transmitting the fifth packet to the network adaptor; and
  transmitting, by the network adaptor, the fifth packet towards the remote host server,
  wherein the AVM and the SVM execute on a computing device,
  wherein the computing device comprises the network adaptor.

9. The method of claim 8, wherein processing by the proxy comprises modifying at least one selected from a header and a payload of the fourth packet.

10. The method of claim 9, wherein modifying the payload comprises encrypting the payload.

11. The method of claim 8, wherein the network adaptor modifies, prior to transmitting, at least an IP header of the fifth packet to include the second IP address as a destination IP address, wherein the second IP address is associated with the remote server host.

12. The method of claim 8, wherein the proxy is an HTTPS proxy.

* * * * *